US007502687B2

(12) United States Patent
Flick

(10) Patent No.: US 7,502,687 B2
(45) Date of Patent: Mar. 10, 2009

(54) VEHICLE TRACKER INCLUDING INPUT/OUTPUT FEATURES AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 157 days.

(21) Appl. No.: 11/076,570

(22) Filed: Mar. 9, 2005

(65) Prior Publication Data

US 2005/0156719 A1    Jul. 21, 2005

Related U.S. Application Data

(63) Continuation of application No. 10/383,496, filed on Mar. 7, 2003, now Pat. No. 7,149,623, which is a continuation of application No. 09/859,972, filed on May 17, 2001, now Pat. No. 6,606,561.

(60) Provisional application No. 60/264,811, filed on Jan. 29, 2001, provisional application No. 60/258,005, filed on Dec. 22, 2000, provisional application No. 60/251,552, filed on Dec. 6, 2000, provisional application No. 60/252,125, filed on Nov. 20, 2000, provisional application No. 60/246,463, filed on Nov. 7, 2000, provisional application No. 60/236,890, filed on Sep. 29, 2000, provisional application No. 60/222,777, filed on Aug. 3, 2000, provisional application No. 60/205,178, filed on May 17, 2000.

(51) Int. Cl.
*G01C 21/00* (2006.01)

(52) U.S. Cl. ............... 701/213; 701/200; 340/539.13; 180/287; 307/10.2; 455/456.1

(58) Field of Classification Search .............. 455/404.1, 455/456.1, 521; 340/426.11, 5.2, 5.8, 989, 340/991, 438, 988, 426.1, 426.19, 539.13; 701/2, 207, 210–213, 21, 117, 200; 307/10.5, 307/10.2; 180/287
See application file for complete search history.

(56) References Cited

U.S. PATENT DOCUMENTS 4,837,700 A    6/1989    Ando et al. ................. 364/449
(Continued)

FOREIGN PATENT DOCUMENTS

CA            2133673            4/1996
(Continued)

OTHER PUBLICATIONS

Unknown, Stolen cars phone home, Machine Design, vol. 62, No. 18, Sep. 6, 1990, pp. 78-79.*
(Continued)

*Primary Examiner*—Cuong H Nguyen
(74) *Attorney, Agent, or Firm*—Allen, Dyer, Doppelt, Milbrath & Gilchrist, P.A.

(57) ABSTRACT

A tracking unit for a vehicle may include a vehicle position determining device, a wireless communications device, and a controller cooperating with the wireless communications device and the vehicle position determining device to determine and send vehicle position information to a user. The controller may store a user selected reference location, and send the vehicle position information based upon the vehicle moving beyond a radial threshold distance from the user selected reference location. More particularly, the vehicle position information may be sent a threshold time after the vehicle moves beyond the radial threshold distance from the user selected reference location if the vehicle has not moved back within the radial threshold distance. Additionally, the vehicle tracking unit may further include at least one input device to be positioned within the vehicle for setting the user selected reference location.

14 Claims, 10 Drawing Sheets

U.S. PATENT DOCUMENTS

| | | | |
|---|---|---|---|
| 5,024,186 A | 6/1991 | Long et al. | 123/179 B |
| 5,043,736 A | 8/1991 | Darnell et al. | 342/357 |
| 5,055,851 A | 10/1991 | Sheffer | 342/457 |
| 5,177,490 A | 1/1993 | Ando et al. | 342/357 |
| 5,223,844 A | 6/1993 | Mansell et al. | 342/357 |
| 5,262,774 A | 11/1993 | Kuwahara et al. | 340/988 |
| 5,334,986 A | 8/1994 | Fernhout | 342/357 |
| 5,349,329 A * | 9/1994 | Smith | 340/539.21 |
| 5,365,450 A | 11/1994 | Schuchman | 364/449 |
| 5,398,190 A | 3/1995 | Wortham | 364/460 |
| 5,483,455 A | 1/1996 | Lay et al. | 364/448 |
| 5,495,224 A * | 2/1996 | Adar | 340/426.26 |
| 5,515,043 A | 5/1996 | Berard et al. | 340/988 |
| 5,515,285 A | 5/1996 | Garrett, Sr. et al. | 364/460 |
| 5,554,982 A * | 9/1996 | Shirkey et al. | 340/903 |
| 5,570,087 A | 10/1996 | Lemelson | 340/870.05 |
| 5,572,204 A | 11/1996 | Timm et al. | 340/988 |
| 5,587,715 A | 12/1996 | Lewis | 342/357 |
| 5,588,038 A | 12/1996 | Snyder | 379/57 |
| 5,608,272 A * | 3/1997 | Tanguay | 307/10.2 |
| 5,641,030 A * | 6/1997 | Toselli | 180/9.32 |
| 5,652,570 A * | 7/1997 | Lepkofker | 340/573.4 |
| 5,673,305 A | 9/1997 | Ross | 379/58 |
| 5,682,133 A | 10/1997 | Johnson et al. | 340/426 |
| 5,740,047 A * | 4/1998 | Pilley et al. | 701/120 |
| 5,751,245 A * | 5/1998 | Janky et al. | 342/357.07 |
| 5,777,580 A | 7/1998 | Janky et al. | 342/457 |
| 5,825,283 A | 10/1998 | Camhi | 340/438 |
| 5,895,436 A | 4/1999 | Savoie et al. | 701/214 |
| 5,917,405 A * | 6/1999 | Joao | 340/426.17 |
| 5,917,423 A * | 6/1999 | Duvall | 340/825.37 |
| 5,927,240 A * | 7/1999 | Maxon | 123/179.3 |
| 5,929,753 A * | 7/1999 | Montague | 340/426.19 |
| 5,933,080 A | 8/1999 | Nojima | 340/539 |
| 5,939,975 A | 8/1999 | Tsuria et al. | 340/426 |
| 5,944,768 A | 8/1999 | Ito et al. | 701/200 |
| 5,969,433 A * | 10/1999 | Maggiora et al. | 307/10.5 |
| 5,969,595 A * | 10/1999 | Schipper et al. | 340/426.19 |
| 5,983,161 A | 11/1999 | Lemelson et al. | 701/301 |
| 5,986,543 A | 11/1999 | Johnson | 340/426 |
| 6,018,657 A | 1/2000 | Kennedy, III et al. | 455/426 |
| 6,025,744 A | 2/2000 | Bertolet et al. | 340/426 |
| 6,028,537 A * | 2/2000 | Suman et al. | 340/988 |
| 6,049,269 A | 4/2000 | Byrd et al. | 340/426 |
| 6,055,426 A | 4/2000 | Beasley | 455/432 |
| 6,067,007 A | 5/2000 | Gioia | 340/426 |
| 6,069,570 A | 5/2000 | Herring | 340/825.49 |
| 6,075,458 A | 6/2000 | Ladner et al. | 340/825.49 |
| 6,101,443 A | 8/2000 | Kato et al. | 701/210 |
| 6,115,669 A | 9/2000 | Watanabe et al. | 701/209 |
| 6,116,639 A | 9/2000 | Breed et al. | 280/735 |
| 6,128,571 A | 10/2000 | Ito et al. | 701/201 |
| 6,131,067 A | 10/2000 | Girerd et al. | 701/213 |
| 6,133,855 A | 10/2000 | Kim | 340/932.2 |
| 6,140,956 A | 10/2000 | Hillman et al. | 342/357.07 |
| 6,148,212 A | 11/2000 | Park et al. | 455/456 |
| 6,151,551 A | 11/2000 | Geier et al. | 701/207 |
| 6,154,152 A | 11/2000 | Ito | 340/988 |
| 6,154,648 A | 11/2000 | Comer | 455/426 |
| 6,166,626 A | 12/2000 | Janky et al. | 340/426 |
| 6,167,255 A | 12/2000 | Kennedy, III et al. | 455/414 |
| 6,167,346 A * | 12/2000 | Fukawa | 701/208 |
| 6,169,497 B1 | 1/2001 | Robert | 340/988 |
| 6,181,253 B1 * | 1/2001 | Eschenbach et al. | 340/825.37 |
| 6,195,597 B1 | 2/2001 | Yamada | 701/1 |
| 6,211,818 B1 | 4/2001 | Zach, Sr. | 342/357.07 |
| 6,236,365 B1 | 5/2001 | LeBlanc et al. | 342/457 |
| 6,240,365 B1 | 5/2001 | Bunn et al. | 701/213 |
| 6,259,381 B1 | 7/2001 | Small | 340/988 |
| 6,275,773 B1 | 8/2001 | Lemelson et al. | 701/301 |
| 6,298,306 B1 | 10/2001 | Suarez et al. | 701/213 |
| 6,313,791 B1 | 11/2001 | Klanke | 342/357.17 |
| 6,314,366 B1 | 11/2001 | Farmakis et al. | 701/201 |
| 6,320,535 B1 | 11/2001 | Hillman et al. | 342/357.1 |
| 6,321,091 B1 | 11/2001 | Holland | 455/456 |
| 6,330,499 B1 | 12/2001 | Chou et al. | 701/33 |
| 6,331,825 B1 | 12/2001 | Ladner et al. | 340/988 |
| 6,339,745 B1 | 1/2002 | Novik | 701/208 |
| 6,340,935 B1 | 1/2002 | Hall | 340/932.2 |
| 6,363,323 B1 * | 3/2002 | Jones | 701/213 |
| 6,430,500 B1 | 8/2002 | Kubota et al. | 701/209 |
| 6,486,801 B1 * | 11/2002 | Jones | 340/994 |
| 6,516,273 B1 * | 2/2003 | Pierowicz et al. | 701/301 |
| 6,526,335 B1 * | 2/2003 | Treyz et al. | 701/1 |
| 6,542,076 B1 * | 4/2003 | Joao | 307/10.2 |
| 6,542,077 B2 * | 4/2003 | Joao | 340/426.16 |
| 6,549,130 B1 * | 4/2003 | Joao | 307/10.2 |
| 6,611,755 B1 * | 8/2003 | Coffee et al. | 701/213 |
| 6,756,917 B2 * | 6/2004 | Gould et al. | 340/988 |
| 6,958,688 B1 * | 10/2005 | Barnett | 340/506 |
| 7,171,187 B2 * | 1/2007 | Haave et al. | 455/404.2 |
| 7,215,241 B2 * | 5/2007 | Ghazarian | 340/426.26 |
| 7,323,970 B1 * | 1/2008 | Murray et al. | 340/426.12 |
| 2001/0045886 A1 | 11/2001 | Minowa | 340/7.45 |
| 2002/0121969 A1 * | 9/2002 | Joao | 340/425.5 |
| 2002/0196161 A1 * | 12/2002 | Gould et al. | 340/988 |
| 2003/0050038 A1 * | 3/2003 | Haave et al. | 455/404 |
| 2003/0128104 A1 * | 7/2003 | Lessard et al. | 340/426.11 |
| 2004/0198309 A1 * | 10/2004 | Duvall | 455/404.1 |
| 2005/0073389 A1 * | 4/2005 | Chandley | 340/5.31 |
| 2005/0130670 A1 * | 6/2005 | Gould et al. | 455/456.1 |
| 2005/0135287 A1 * | 6/2005 | Gould et al. | 370/310 |
| 2005/0248444 A1 * | 11/2005 | Joao | 340/426.13 |
| 2005/0252493 A1 * | 11/2005 | Simmons | 123/480 |

FOREIGN PATENT DOCUMENTS

| | | | |
|---|---|---|---|
| CA | 2309899 | * | 5/2000 |
| EP | 1500565 A1 * | | 1/2005 |
| EP | 1743816 A1 * | | 1/2007 |
| JP | 2002505228 W * | | 2/2002 |
| WO | WO 9632307 A1 * | | 10/1996 |
| WO | WO 9632830 A2 * | | 10/1996 |
| WO | WO 9944870 A1 * | | 9/1999 |
| WO | WO 03016108 A1 * | | 2/2003 |

OTHER PUBLICATIONS

Unknown, Onstar Literature, from http://www.onstar.com, Onstar Corp., Unknown date.*

Rick Tetzeli, Cargo that phones home, Fortune Magazine, Nov. 15, 1993.*

A Study on Predicting Hazard Factors for Safe Driving; Takahashi, H.; Ukishima, D.; Kawamoto, K.; Hirota, K.; Industrial Electronics, IEEE Transactions on; vol. 54, Issue 2, Apr. 2007 pp. 781-789; Digital Object Identifier 10.1109/TIE.2007.891651.*

On distributed fault-tolerant detection in wireless sensor networks; Luo, X.; Dong, M.; Huang, Y.;Computers, IEEE Transactions on; vol. 55, Issue 1, Jan. 2006 pp. 58-70; Digital Object Identifier 10.1109/TC.2006.13.*

A self-organizing hybrid sensor system with distributed data fusion for intruder tracking and surveillance; Palaniappan, R.; Clarke, T.; Wahid, P.; Behdad, N.; Kincaid, P.; Antennas and Propagation Society International Symposium, 2008. AP-S 2008. IEEE; Jul. 5-11, 2008 pp. 1-4; Digital Object Identifier 10.1109/APS.2008.4619564.*

Collaborative event detection using mobile and stationary nodes in sensor networks; Lambrou, T.P.; Panayiotou, C.G.; Collaborative Computing: Networking, Applications and Worksharing, 2007. CollaborateCom 2007. International Conference on Nov. 12-15, 2007 pp. 106-115; Digital Object Identifier 10.1109/COLCOM.2007.4553818.*

Energy efficient sleep scheduling based on moving directions in target tracking sensor network; Bo Jiang; Kai Han; Ravindran, B.; Hyeonjoong Cho; Parallel and Distributed Processing, 2008. IPDPS 2008. IEEE International Symposium on; Apr. 14-18, 2008 pp. 1-10; Digital Object Identifier 10.1109/IPDPS.2008.4536330.*

Evaluating Proximity Relations Under Uncertainty; Zhengdao Xu; Jacobsen, H.-A.; Data Engineering, 2007. ICDE 2007. IEEE 23rd International Conference on; Apr. 15-20, 2007 pp. 876-885; Digital Object Identifier 10.1109/ICDE.2007.367933.*

SVATS: A Sensor-Network-Based Vehicle Anti-Theft System; Hui Song; Sencun Zhu; Guohong Cao; INFOCOM 2008. The 27th Conference on Computer Communications. IEEE; Apr. 13-18, 2008 pp. 2128-2136; Digital Object Identifier 10.1109/INFOCOM.2008.279.*

Localization of ahead vehicles with on-board stereo cameras; Zanin, M.; Image Analysis and Processing, 2007. ICIAP 2007. 14th International Conference on; Sep. 10-14, 2007 pp. 111-116; Digital Object Identifier 10.1109/ICIAP.2007.4362766.*

Intelligent Object-Tracking using Sensor Networks; Sridhar, P.; Madni, A.M.; Jamshidi, M.; Sensors Applications Symposium, 2007. SAS '07. IEEE; Feb. 6-8, 2007 pp. 1-5; Digital Object Identifier 10.1109/SAS.2007.374384.*

Omega Research and Development, Inc., "GPS 2000", distributed at Consumer Electronics Show in Las Vegas, NV, Jan. 2001, pp. 1-4.

Omega Research and Development, Inc., "Omega Thinks Customers Don't Know Jack!", distributed at Consumer Electronics Show in Las Vegas, NV, Jan. 2001, one page.

* cited by examiner

VEHICLE TRACKER INCLUDING INPUT/OUTPUT FEATURES AND RELATED METHODS

RELATED APPLICATIONS

The present application is a continuation of U.S. patent application Ser. No. 10/383,496 filed Mar. 7, 2003 now U.S. Pat. No. 7,149,623, which is a continuation of U.S. patent application Ser. No. 09/859/972 filed on May 17, 2001 now U.S. Pat. No. 6,606,561 which, in turn, was based upon provisional patent application Ser. Nos. 60/264,811 filed on Jan. 29, 2001; 60/258,005, filed Dec. 22, 2000; 60/251,552, filed Dec. 6, 2000; 60/252,125, filed Nov. 20, 2000; 60/236,890, filed Sep. 29, 2000; 60/246,463, filed Nov. 7, 2000; 60/222,777, filed Aug. 3, 2000; 60/205,178, filed May 17, 2000; and non-provisional U.S. patent application Ser. No. 09/859,972, the entire contents of each of which are incorporated herein by reference.

FIELD OF THE INVENTION

The present invention relates to the field of vehicle devices, and, more particularly, to a tracking and alerting system for a vehicle.

BACKGROUND OF THE INVENTION

Motor vehicles, such as passenger cars, trucks, busses, fleet vehicles, etc. are widely used and knowing the locations of such vehicles is often desired. For example, should a vehicle be stolen, it would be beneficial to know the vehicle's location so that authorities could be promptly and accurately directed to retrieve the vehicle. Indeed, the tracking system could plot the getaway path of the thief.

For a company with hired drivers, it may be desirable to know the driver's whereabouts during the course of the day. Similarly, a rental car agency or other fleet operator, for example, may wish to know the whereabouts of its fleet of vehicles.

It may also be desirable to track the location of a vehicle as it is used throughout the course of a normal day. For parents of younger or older drivers, for example, knowledge of the vehicle's location may provide some assurance that the driver is at designated locations and following a prescribed route.

A number of patents disclose various systems and approaches to tracking vehicles. For example, U.S. Pat. No. 5,223,844 discloses a tracking system including a control center and a mobile unit installed in the vehicle. The mobile unit may send security warnings to the command center via a wireless transceiver. Position information for the vehicle is determined using a GPS receiver at the vehicle.

U.S. Pat. No. 5,515,043 discloses a similar system which may send one or more preprogrammed telephone messages to a user when away from the vehicle. The user may remotely access location information or cause certain commands to be carried out by entering a personal identification number (PIN).

The widespread availability and use of the Internet has prompted a number of vehicle tracking systems to also make use of the Internet. For example, TelEvoke, Inc. proposed such a system in combination with Clifford Electronics. The system was to provide notification, control and tracking services via the telephone or the Internet. Users could be notified via phone, e-mail, or pager of events such as a car alarm being triggered. Users could control the vehicle remote devices via phone, web, or PDA such as unlocking car doors. Additionally, users could track TelEvoke-enabled vehicles on the Internet or via the telephone. An Internet map could be viewed by the user showing the actual and prior vehicle locations. TelEvoke offered its services via a centralized fully automated Network Operations Center. To reduce the communications costs, it was proposed to use the control channel of the cellular telephone network.

There are, of course, a number of vehicles which come from the manufacturer with some form of security system already installed. In addition, a number of vehicles are also equipped with aftermarket security systems. Many conventional vehicle tracking units may not be readily installed in vehicles, particularly those vehicles already including a vehicle security system. In addition, complexity of installation may significantly increase the system costs.

SUMMARY OF THE INVENTION

In view of the foregoing background, it is therefore an object of the present invention to provide a vehicle tracking unit which may be relatively easily programmed and used for determining whether a vehicle has been removed from a predetermined area.

This and other objects, features, and advantages in accordance with the present invention are provided by a tracking unit for a vehicle which may include a vehicle position determining device, a wireless communications device, and a controller cooperating with the wireless communications device and the vehicle position determining device to determine and send vehicle position information to a user. The controller may store a user selected reference location, and send the vehicle position information based upon the vehicle moving beyond a radial threshold distance from the user selected reference location.

More particularly, the vehicle position information may be sent a threshold time after the vehicle moves beyond the radial threshold distance from the user selected reference location if the vehicle has not moved back within the radial threshold distance. By so doing, the area defined by the user selected reference location and the radial threshold distance may be made smaller than with prior art approaches while still reducing unwanted false alarms, such as from test drives at a dealership during which the vehicle travels briefly outside of the bounded area.

The vehicle tracking unit may further include at least one input device to be positioned within the vehicle for setting the user selected reference location. The at least one input device may also permit user setting of the threshold time. By way of example, the at least one input device may include at least one of a switch, a keyboard, and a keypad. The at least one input device may also cooperate with the vehicle position determining device and the controller to set a current vehicle position as the user selected reference location. Accordingly, a user may advantageously set the user selected reference location (and/or the threshold time) to correspond to any desired position of the vehicle.

Moreover, the threshold time may also be set by the user when away from the vehicle. Further, the controller may set the user selected reference location based upon at least one signal provided remotely by the user. For example, the controller may also cooperate with the vehicle position determining device to set a current vehicle position as the user selected reference location based upon the at least one signal provided remotely by the user. In addition, the at least one signal may include the user selected reference location.

By way of example, the radial threshold distance may be less than about five miles, and the threshold time may be less than about thirty minutes, although other values may also be used. Additionally, the controller may include at least one memory for storing the user selected reference location and vehicle position information therein, and the vehicle position determining device may be a Global Positioning System (GPS) device, for example.

A method aspect of the invention is for tracking a vehicle using a vehicle tracking unit to be carried by the vehicle. The method may include storing a user selected reference location for the vehicle tracking unit; determining vehicle position information using the vehicle tracking unit; and sending vehicle position information from the vehicle tracking unit to a user based upon the vehicle moving beyond a radial threshold distance from the user selected reference location.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Figure 1:
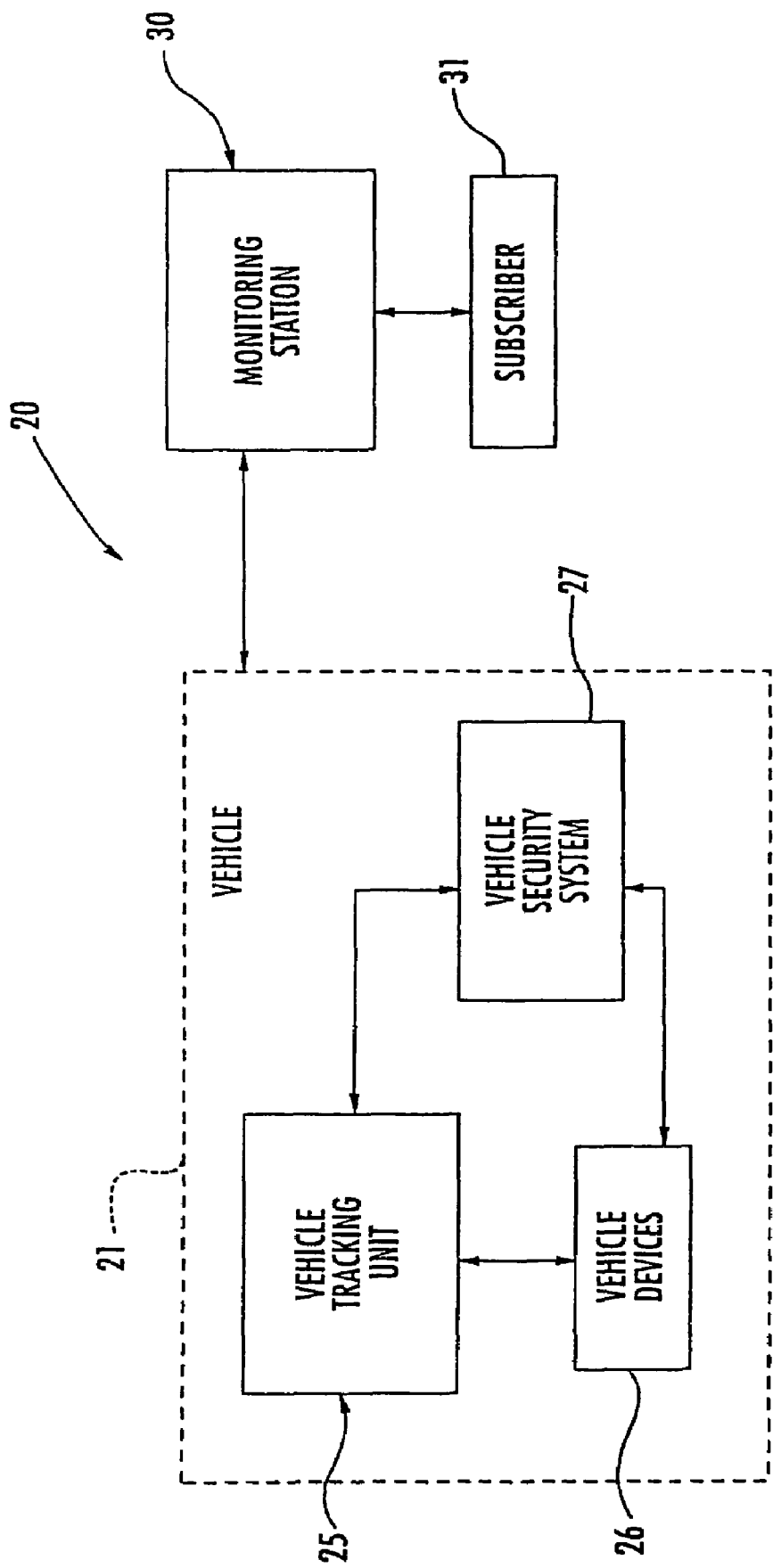
FIG. 1 is a simplified block diagram of a vehicle tracking system in accordance with the present invention.
Figure 2:
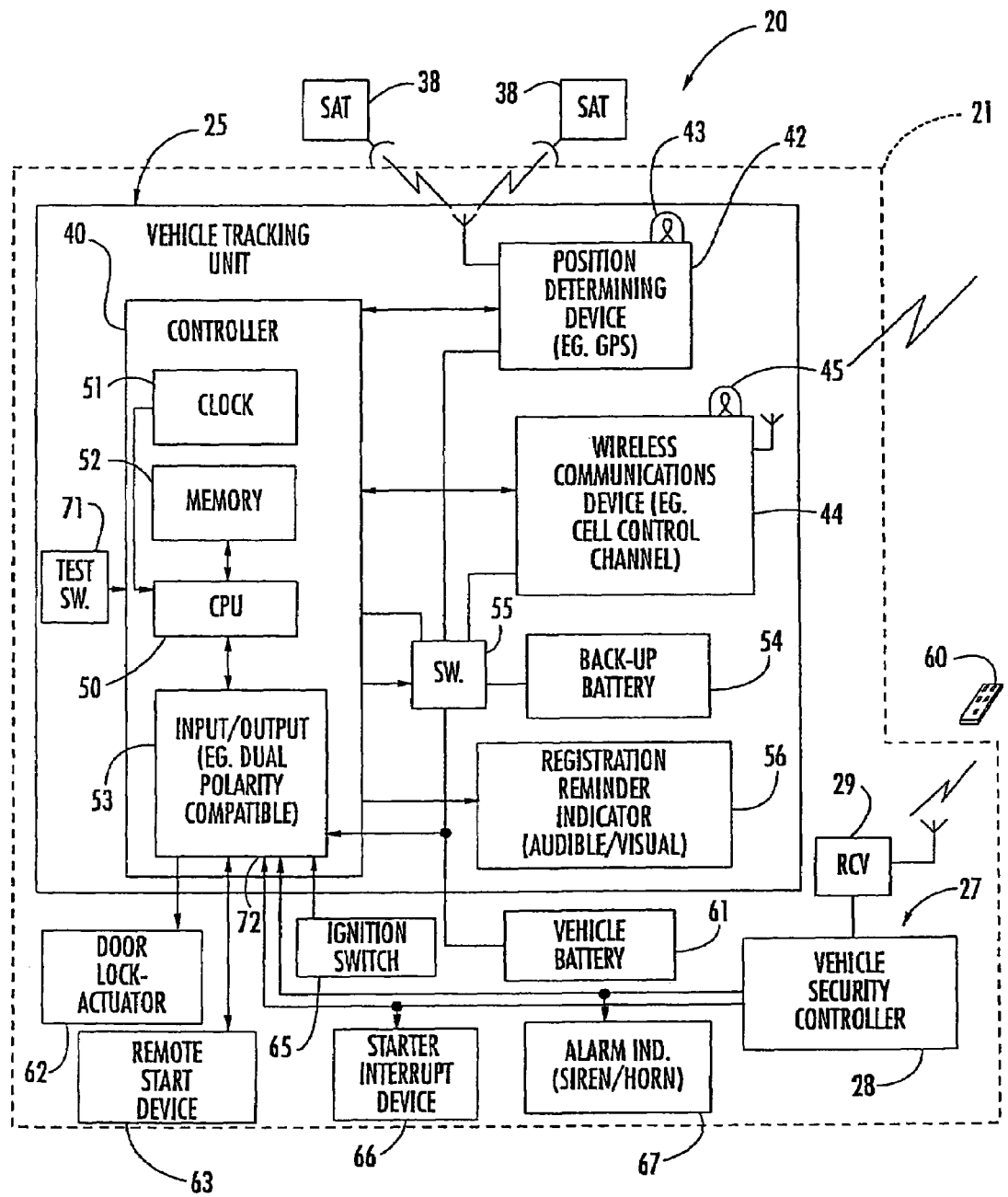
FIG. 2 is a more detailed block diagram of the vehicle tracking unit as shown in FIG. 1.
Figure 3:
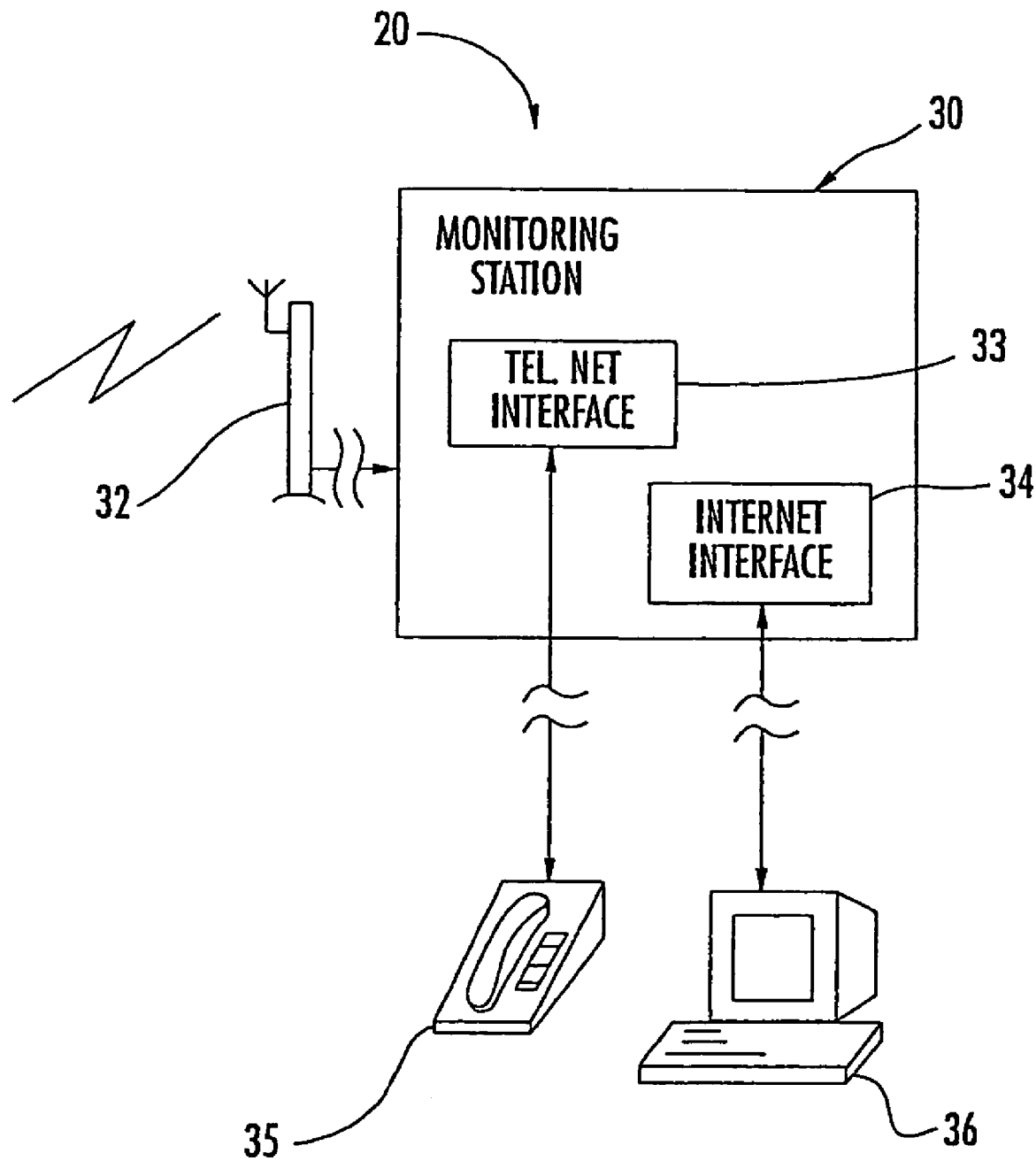
FIG. 3 is a more detailed block diagram of the monitoring station as shown in FIG. 1.

Referring to FIGS. 1-3, the vehicle tracking system 20 in accordance with the invention is now initially described. The vehicle system 20 illustratively includes a vehicle tracking unit 25 to be mounted in the vehicle 21 and a monitoring station 30 which is remote from the vehicle and which is typically in a fixed location. In the illustrated embodiment, the vehicle tracking unit 25 interfaces with various vehicle devices, such as may include security sensors, door locks, etc. as will be appreciated by those skilled in the art.

The vehicle tracking unit 25 is also illustratively connected to a separate vehicle security system 27 as may already be installed in the vehicle 21, from the factory or installed as an aftermarket product. Those of skill in the art will appreciate that in some embodiments of the vehicle tracking system 20 a separate vehicle security system 27 may not be needed, and/or various features thereof can be readily incorporated in the vehicle tracking unit 25.

The monitoring station 30 may typically service a number of subscribers 31. As shown perhaps best in FIG. 3, the monitoring station 30 may include a user interface, such as the schematically illustrated telephone network interface 33 and the internet interface 34 which are schematically coupled to a telephone 35, and a computer 36, respectively. Of course in other embodiments, other interfaces may be used and only one of the illustrated interfaces may be needed. Those of skill in the art will also recognize that messages may be sent to a subscriber or user via preprogrammed voice messages, e-mail messages, facsimile messages, pager alerts, etc. In addition commands or instructions from the subscriber can also be input to the monitoring station 30 via the telephone network interface 33 and/or the internet interface 34, from the subscribers telephone 35 or computer 36.

The monitoring station 30 is illustratively connected to a cellular telephone tower 32 which, in turn, may communicate with the vehicle tracking unit 25 in some embodiments of course, in other embodiments other communications approaches are also contemplated, such as, for example, including satellite communications.

The monitoring station 30 may typically include the necessary modems, and other communications electronics, and computers for its functions which are described in greater detail below. The configuration of such components and their details will be readily apparent to those skilled in the art. Accordingly, no further discussion of these details is needed.

Referring now more specifically to FIG. 2, additional details of the vehicle tracking unit 25 and devices at the vehicle are now further described. The vehicle tracking unit 25 illustratively includes a controller 40, a vehicle position determining device 42, and a wireless communications device 44 connected together. The vehicle position determining device 42 may be provided by a GPS receiver, for example. The GPS receiver typically operates by receiving multiple signals from spaced apart satellites 38 as will be appreciated by those skilled in the art.

In other embodiments, the vehicle position determining device 42 may be provided based upon communications with the cellular telephone network, or based upon other satellite transmissions, for example. As a particular example, time of arrival techniques are available based upon multiple reception paths to determine position via the cellular telephone network as will be appreciated by those skilled in the art. The vehicle position determining device 42 also illustratively includes an indicator 43 associated therewith, such as for indicating an operating mode, or proper operation of the device as will be addressed in greater detail below.

The wireless communications device 44 may be provided by a cellular telephone transceiver configured to operate on a control channel of the cellular network. Such a control channel may provide nearly universal coverage for the tracking system 20 as will be appreciated by those skilled in the art. In addition, the control channel may offer relatively inexpensive communications between the monitoring station 30 and the vehicle tracking unit 25 as will be appreciated by those skilled in the art. The wireless communications device 44 also illustratively includes an optional status indicator 45 with a similar function as the indicator 43 for the vehicle position determining device.

The wireless communications device 44 in other embodiments, may transmit in the voice band of the cellular network. Alternately, the wireless communications device may communicate over other networks, such as over satellite, or via wireless internet services, as will be appreciated by those skilled in the art.

The controller 40 illustratively includes a central processing unit (CPU) 50 or other logic circuitry which is connected to a clock signal generator 51 and a memory 52. In other embodiments, the memory 52 may be an embedded memory in the CPU 50. The controller 40 also includes schematically illustrated input/output circuitry 53 to interface with various vehicle devices. In particular the input/output circuitry 53 may provide dual polarity compatibility for one or more inputs or outputs as will be described in greater detail below. One or more of the terminals of the input/output circuitry 53 may also provide both input and output functions as will also be described in greater detail below. This may significantly simplify and accelerate installation of the vehicle tracking unit 25 in the vehicle 21.

Also illustratively shown as part of the vehicle tracking unit 25 are a back-up battery 54, and switch 55 connected thereto for selectively powering certain of the components based upon the controller 40. Of course, the vehicle 21 also includes an electrical system including the vehicle battery 61. Powering of the vehicle tracking unit 25 is described in greater detail below.

The vehicle 21 also includes a number of other components that may relate to vehicle tracking, security, and/or convenience features provided by the vehicle tracking system 20. For example, the vehicle 21 may include one or more door lock actuators 62, an optional remote starting device 63, a starter interrupt device 66 and an alarm indicator 67. For example, the alarm indicator may be provided by a vehicle horn or vehicle siren, and/or flashing of the lights.

The optional separate security system 27 illustratively includes a vehicle security controller 28 and a receiver 29 connected thereto. As is conventional, the vehicle security system 27 may be switched between armed and disarmed modes, for example, by one or more uniquely coded remote transmitters 60. The vehicle security controller 28 may also be capable of learning a new uniquely coded remote transmitter 60 as will be appreciated by those skilled in the art. The vehicle security controller 28 also illustratively is connected to the starter interrupt device 66 and the alarm indicator 67.

For ease of explanation, a number of the features of the vehicle tracking system 20 are now described. The vehicle tracking system 20 includes a number of features that may simplify installation and maintenance. For example, as shown in FIG. 2, the vehicle tracking unit 25 may have a test switch 71 connected to the controller 40.

In normal operation, the controller 40 may be called upon to operate at least one vehicle device. Of course, the controller 40 also cooperates with the wireless communications device 44 and the vehicle position determining device 42 to determine and send vehicle position information to the monitoring station 30. Moreover, the controller 40 may be switchable to a test mode for test operation of the at least one vehicle device responsive to activation of the test switch 71.

In some embodiments, the at least one vehicle device may be a plurality of vehicle devices that are tested by operation in sequence. For example, the at least one vehicle device may comprise at least one door lock actuator 62. The at least one vehicle device may also comprise the starter interrupt device 66, or the engine remote starter 63 if remote starting is an implemented feature. The at least one vehicle device which is tested, may also be the alarm indicator 67. Accordingly, an installer, for example, can quickly check that the tracking unit has been properly installed.

To further provide for ready determination of proper operation of the vehicle tracking unit 25, one or both of the position determining and wireless communications devices 42, 44 may include associated indicators 43, 45 as mentioned briefly above, and which provide an indication relating to proper operation. Each indicator 43, 45 may indicate a mode of operation of the device, its proper operation, or a partial or complete failure of the device.

Another aspect of the invention is that the controller 40 may provide a selectable polarity for the at least one vehicle device based upon sensing thereof. Accordingly, a predetermined activation of the test switch 71 may cause the controller 40 to sense and select the proper polarity. Pressing the test switch 71 for a predetermined time or in a predetermined pattern may sense and set the polarity.

Another feature of the vehicle tracking unit 25 and vehicle tracking system 20 relates to conservation of the number of codes or messages that need to be sent to the vehicle tracking unit. In particular, the controller 40 may have a plurality of different controller states and respond differently to a same message from the monitoring station 30 at different times depending upon the controller state at a given time. Accordingly, a number of codes or messages used by the system can be conserved. Various messages are described in greater detail below.

A controller state may change based upon several different occurrences or events. For example the controller may change states in response to a change in at least one vehicle device, or based upon a message received by the wireless communications device 44 from the monitoring station 30, and/or based upon elapsed time. The controller states, for example, may include an alert sent state based upon an alert message being sent from the wireless communications device 44. Thereafter, receipt of a predetermined message by the wireless communications device 44 when the controller 40 is in the alert sent state may confirm receipt of the alert message by the monitoring station.

Receipt of the predetermined message by the wireless communications device 44 when the controller 40 is in another state different than the alert sent state may thus cause a different response by the controller. The alert sent state may comprise at least one of a vehicle stolen alert sent state, a vehicle alarm sounding alert sent state, a vehicle speeding alert sent state, an unauthorized remote transmitter alert sent state, a low vehicle battery alert sent state, and a device malfunction alert sent state. The various alert messages and confirmation thereof are described in greater detail below.

The code or message conservation aspects of the vehicle tracking system 20 also permit sending a sequence of codes or messages within a predetermined time to also cause a different response at the vehicle tracking unit 25. In other words, the plurality of controller states may comprise a received first message state based upon a first message being received by the wireless communications device 44 from the monitoring station 30. Receipt of a second message by the wireless communications device 44 when the controller 40 is in the received first message state, such as within a predetermined time window, for example, may thus cause a different response by the controller than does receipt of the second message when the controller is in another state than the received first message state.

The plurality of controller states may comprise a vehicle finder state sounding an audible signal via the alarm indicator 67 at the vehicle 21. In this state the controller 40 would bypass sending a vehicle alarm sounding alert to the monitoring station 30.

Another aspect of the vehicle tracking system 20 is the provision of certain power conservation and management techniques, such as to permit extended periods where the vehicle 21 is not in operation. During such extended periods, the vehicle battery 61 provides power to the vehicle tracking unit 25 as well as other vehicle devices. Accordingly, the voltage of the vehicle battery 61 drops over time. The vehicle tracking unit 25 may provide a significant drain on the vehicle battery 61 because of the power consumed by the wireless communications device 44 during transmission as will be appreciated by those skilled in the art.

The vehicle position determining device 42, the wireless communications device 44 and the controller 40 may be considered as defining a power load of the vehicle tracking unit 25. The controller 40 may operate the schematically illustrated power switch 55 to isolate the back-up battery 54 from the power load as a voltage of the vehicle battery 61 drops until reaching a threshold. After or below the threshold the controller 40 may cause the back-up battery 54 to selectively power only a first portion of the power load while a second portion of the power load remains powered by the vehicle battery.

For example, the wireless communications device 44 may have a higher operating voltage than the vehicle position determining device 42. The first portion of the power load that is selectively powered despite the low vehicle battery voltage may thus be the wireless communications device 44. In particular, the wireless communications device 44 may be powered for transmission. Accordingly, the back-up battery 54 can be saved for limited communication using the higher voltage wireless communications device 44. This provides useful features even after an extended period during which the vehicle 21 is left unattended and the vehicle battery 61 gradually discharges.

To further conserve power, the controller 40 may reduce operation of the power load as vehicle battery voltage falls. Conversely, the controller 40 may restore operation of the power load based upon the voltage of the vehicle battery 61 rising again, such as upon being recharged.

Also relating to power consumption, the controller 40 further causes transmission of a low vehicle battery voltage alert to the monitoring station 30 based upon the voltage of the vehicle battery 61 falling below the threshold. The user or subscriber may cause the monitoring station 30 to issue a remote start command. The controller 40 may then generate a remote start output to the remote start device 63 to thereby start the engine and recharge the vehicle battery.

Another feature of the vehicle tracking system 20 is that the vehicle tracking unit 25 may be readily installed and connected to a vehicle 21, such as in the illustrated embodiment where the vehicle includes a starter interrupt device 66 and a separate vehicle security controller 28. More particularly, the controller 40 may switch between an armed mode and a disarmed mode based upon operation of the engine starter interrupt device 66. The controller 40 when in the armed mode may cooperate with the wireless communications device 44 to send an alert message to the monitoring station 30 and including vehicle position information, for example, based upon the vehicle position determining device 42. The controller 40 is also for selectively operating the engine starter interrupt device 66 to provide additional security features.

In one advantageous embodiment, the controller 40 preferably comprises a combination input and output terminal for connection to the engine starter interrupt device. This terminal is at the input/output circuitry 53 and is schematically illustrated by reference numeral 72. The controller 40 may switch to the armed mode when in the disarmed mode and based upon the engine starter interrupt device 66 being operated to disable engine starting. Conversely, the controller 40 may switch to the disarmed mode based upon the engine starter interrupt device 66 being operated to enable engine starting. In other words, the vehicle tracking unit 25 can piggyback its arming and disarming off the existing vehicle security system 27, for example.

The controller 40 may also selectively operate the engine starter interrupt device 66 based upon a command message from the monitoring station 30. The controller 40 may selectively operate the engine starter interrupt device 66 based upon a command message from the monitoring station 30. Alternately, or in addition thereto, the controller 40 may selectively operate the engine starter interrupt device 66 based upon the ignition switch 65.

The following descriptive portions relate to various user or subscriber notifications and features provided by the vehicle tracking system 20. Of course, the controller 40 preferably cooperates with the wireless communications device 44 to send an alert message. The monitoring station 30 may comprise a user interface, such as one or both of the telephone network or internet interfaces 33, 34, respectively (FIG. 3), for generating a sequence of alert message notifications based upon receiving the alert message sent from the vehicle tracking unit 25. More particularly, the monitoring station interface permits canceling any remaining alert message notification based upon a cancellation command response from a user or subscriber having already received the alert message notification. The user may send the cancellation response via the telephone 35 or computer 36 (FIG. 3), for example. Thus, if the user may be reached at different telephone numbers or different users are desirably notified of the alert, this aspect of the vehicle tracking system 20 can make the notifications efficiently and without making unnecessary notifications.

The vehicle tracking system 20 may provide any of a number of very useful alerts, as discussed herein. For example, the alert message sent from the vehicle tracking unit may comprise at least one of a vehicle stolen alert message, and a vehicle alarm sounding alert message. The alert message may be one of a vehicle speeding alert message, and a vehicle acceleration alert message. In addition, the alert message may comprise an unauthorized remote transmitter alert message. Also, the alert message may be at least one of a low vehicle battery alert message, and a device malfunction alert message.

The speeding alert may be based upon exceeding a speed threshold for greater than a certain time, which may be user selectable. The acceleration alert may also be useful as such is also indicative of aggressive driving along with the speeding alert. The unauthorized remote transmitter alert increases overall security since a user will be notified if a would-be thief learns an unauthorized transmitter to operate the controller. These alerts are described in greater detail below.

The vehicle tracking system 20 may be implemented as a service to a subscriber. In other words, the subscriber pays a monthly fee for the service. Accordingly, it may be important to encourage a user to register. Similar subscriber or registrations systems in the past have suffered revenue losses since some users would wait to activate the system until the vehicle was stolen. In other words, the user would only subscribe or register and pay a single month's fee.

In accordance with this aspect of the vehicle tracking system 20 prompt user registration is encouraged. In particular, the vehicle tracking unit 25 may include the user registration reminder indicator 56 and the controller 40 may be switchable from an unregistered mode to a registered mode. In the registered mode, the controller 40 may cooperate with the wireless communications device 44 and the vehicle position determining device 42 to determine and send vehicle position information to the monitoring station 30. In the unregistered mode, the controller 40 may activate the user registration reminder indicator 56 to encourage registration by the user.

The controller 40 may be switchable to the registered mode based upon an activation message from the monitoring station 30. For example, when the registration payment has been received, the monitoring station can send one or more messages to the vehicle tracking unit 25 to stop activation of the registration reminder indicator 56. The indicator 56 may be audible, visual or both. For example, the registration reminder indicator 56 could be a beeping sound generated by a small piezoelectric transducer every ten minutes or so when the ignition 65 is on.

In other words, the user registration reminder indicator 56 may provide a minor but irritating annoyance to the user to encourage registration. Upon successfully registering, the annoyance is abated. Accordingly, a relatively straightforward approach is provided to encourage user registration.

Along these lines, the controller 40 when in the unregistered mode may have reduced features compared to the registered mode. For example, the controller 40 when in the unregistered mode may be restricted or limited in sending messages with the wireless communications device 44. Accordingly, usage of the wireless communications network may be reduced. Transmissions from the vehicle tracking unit 25 may also be beneficially suppressed during original installation, for example.

Returning again to features of the vehicle tracking unit 25 which facilitate installation, the controller 40 may send an alarm indication alert responsive to a continuous activation of the alarm indicator 67 for greater than a predetermined time. Alternately, or in addition thereto, the controller 40 may send an alarm indication alert responsive to a repetitive pattern of alarm indicator 67 activations. In other words, the controller may be configured to distinguish between normal operation of a vehicle horn by the driver, and activation of the horn by the security system 27. As mentioned above, the controller 40 may also monitor signals of at least one of a first and second polarity. The controller 40 thus advantageously piggybacks off the alarm indication generated by the vehicle security system 27 to determine and send a vehicle alarm sounding alert to the monitoring station 30.

In one variation, the controller 40 may monitor signals delivered directly to the vehicle alarm indicator by the vehicle security controller 28. In another variation, the controller 40 monitors signals of voltage dips of the vehicle battery 61. Circuitry is conventionally and readily available for both such functions, as will be readily appreciated by those skilled in the art.

The controller 40 may also include a dual polarity compatible output in the input/output circuitry 53 for a vehicle device, such as the vehicle alarm indicator 67. The controller 40 may further monitor signals relating to activation of the vehicle alarm indicator 67 and send an alarm indication alert with position information from the vehicle position determining device and using the wireless communication device.

For the dual polarity output compatibility, the controller 40 may generate a first polarity output pulse followed by a second polarity output pulse. The controller 40 may also generate a repeating pattern of a first polarity output pulse followed by a second polarity output pulse on the dual polarity compatible output. In yet other embodiments, the controller 40 may sense an actual polarity of the device and thereafter use the actual polarity for the dual polarity compatible output.

Where the vehicle device is a vehicle horn, the controller 40 may typically be configured to generate a negative polarity output on the dual polarity compatible output. Conversely, wherein the vehicle device is a vehicle alarm indicator siren, the controller 40 may be configured to generate a positive polarity output on the dual polarity compatible output.

Another aspect of the vehicle tracking system 20 relates to conserving memory space and/or reducing transmission time over the communications network. In accordance with this advantageous feature, the controller 40 may determine the vehicle position information including a vehicle location and an associated stationary period for each occurrence of the vehicle remaining stationary for greater than a predetermined period. In one embodiment, the controller 40 may cooperate with the wireless transmission device 44 to send the vehicle position information to the monitoring station based upon each occurrence of the vehicle remaining stationary for greater than the predetermined period. In this embodiment, the monitoring station 30 may associate a time with each occurrence of the vehicle remaining stationary for greater than the predetermined period. In other words, the monitoring station 30 may time stamp the received information.

In another embodiment, the controller 40 cooperates with the wireless transmission device 44 to send the vehicle position information to the monitoring station 30 for a plurality of occurrences of the vehicle remaining stationary for greater than the predetermined period. In this embodiment, the controller 40 may associate a time with each occurrence of the vehicle remaining stationary for greater than the predetermined period. In other words, the controller time stamps the position and stationary period information.

As an example, the predetermined time which determines whether the vehicle 21 is stationary and the position should be determined, may be less than about three minutes. This time may filter out vehicle stops in normal traffic, but which will keep track of stops where the driver likely leaves the vehicle 21. Accordingly, only the important information necessary to track the vehicle need be stored and/or transmitted thereby reducing the system costs. If the vehicle 21 is stationary overnight, for example, unnecessary position information need not be determined, stored, and/or transmitted to the monitoring station 30.

The controller 40 may comprise the memory 52 for storing the vehicle position information therein. In one configuration, the controller 40 downloads the vehicle position information from the memory 52 to the monitoring station 30 based upon a predetermined schedule. In another configuration, the controller 40 downloads the vehicle position information from the memory 52 to the monitoring station 30 based upon a predetermined event. In yet another configuration, the controller 40 downloads the vehicle position information from the memory 52 to the monitoring station 30 based upon a predetermined percentage of memory usage.

Having now described certain general features and advantages of the vehicle tracking system 20, this description now turns to additional specific details which are provided as examples. In particular, vehicle tracking system 20 preferably implements one or more of the following features:

1. Detects the vehicle being stolen and transmits a signal to the monitoring station to contact up to 3 people, for example, predetermined by the user, of theft of the vehicle and then starts tracking the vehicle. The contact may be by one or more of the following: an e-mail message, a pager alert, a cellular telephone call, or other telephone call.
2. Detects an optional vehicle security or alarm system activation and transmits a signal to the monitoring station to contact up to 3 predetermined people to inform them the vehicle's alarm is being activated.

3. Detects an optional vehicle alarm system's remote PANIC activation and transmits a signal to the monitoring station to contact up to 3 predetermined people to inform them of the vehicle's PANIC being activated.

4. Detects a vehicle being programmed to operate from an unauthorized remote transmitter, key transponder, other transponder, or other device that has a unique coding, and the vehicle unit transmits a signal to the monitoring station to contact up to 3 predetermined people to inform them of this occurrence. The system can also make available information relating to a number of such coded devices, or a change therein, or when a change occurred. A message can be sent to the user or the information can be available to the user on the website. The vehicle would be equipped with a security system as disclosed in U.S. Pat. No. 5,654,688, for example, which determines an unauthorized transmitter and provides an alert feature. This patent is incorporated herein in its entirety by reference.

5. Detects the vehicle traveling over a predetermined speed, such as for a predetermined time, and transmits a signal to the monitoring station to send a message, such as an e-mail informing the user (and/or others) of this occurrence. Of course, the message could also be sent via a telephone call or page, should additional urgency be required. The vehicle's predetermined maximum speed limit and duration thereof can be selected by the user.

6. Detects a low battery voltage such as for a predetermined time and transmits a signal to the monitoring station to contact up to 3 predetermined people to inform them of vehicle's low battery voltage. This is especially advantageous during winter so that the vehicle could be started, for example, to prevent a problem before it happens. The time setting is preferably selectable by the user.

7. Detects the vehicle not moving for a predetermined time and transmits a signal to the monitoring station to send, for example, a nightly e-mail informing the user of all the vehicle's location and stationary time occurrences. The stationary time length is also electable. This may be advantageous to encourage patrolling personnel not to remain for a long time in a same location.

8. The vehicle unit preferably includes a back-up battery system making it more reliable.

The vehicle unit may be relatively inexpensive. In addition, the monitoring fee that includes sending up to 60 e-mails and making up to 6 phone calls per month, may also be relatively low. The relatively low monitoring fee is based, at least in part, on the current relatively low rates charged for use of the control channel of the cellular telephone network. It is also noted that access to the control channel provides coverage for almost the entire U.S., for example.

The user or subscriber also preferably has access to an Internet site that will display a map and silently contact the vehicle to acquire its current location, speed, direction of travel, and previous multiple locations with speeds, for example, the user's personal identification number (PIN) can be quickly activated by a telephone call. No additional installation may be required.

Certain annual pre-pay package arrangements may be available. For example, up to 10 access entries per month can be provided on a low monthly billing. Up to 30 access entries could be provided also for a relatively low monthly fee.

The present invention provides a number of other significant advantages including optional access from any phone or from any computer to access the monitoring station internet site. The user may control various vehicle functions remotely via the telephone or the internet site. The only charge may be for additional equipment and installation.

Additional features can also be included with the system and subscribed to by the user in accordance with the invention. For example, these include Hijack, Car Finding, Unlock Doors and Unauthorized Transmitter Alert Features. The equipment and installation is relatively inexpensive. For the hijack feature: from any phone or computer, the user may activate vehicle starter interrupt and sound the horn until the vehicle is retrieved (Command 4).

For the Car Finding feature: from any phone or computer, the user may activate the vehicle's horn, or siren and sound same for 30 seconds. This allows the user to find his vehicle in a crowded parking lot (Command 5).

For the Lock/Unlock vehicle doors feature: from any phone or computer a predetermined command (Command 7) activates unlocking of vehicle doors to retrieve keys, for example, that may have been accidentally locked inside the vehicle. Of course, the system can also be used to lock vehicle doors if this was forgotten (Command 6). The unauthorized transmitter alert feature is similarly selected as described above.

In addition, a remote vehicle start feature may also be provided, such as to start the vehicle's engine to heat or cool the vehicle prior to entry. The equipment and installation for remote starting may be relatively low. Some further details of a specific embodiment of the vehicle tracking unit 25 are provided below as relating to use of red and green LED indicators as may be coupled to the controller 40 and operated thereby. Also various representative wires, designated by color, are provided as an example embodiment.

The red LED verifies the GPS receiving signal. With a yellow wire having positive 12 volts, the red LED blinking indicates searching GPS location, constant indicates found location, and off indicates no GPS signal found. With the yellow wire not having positive 12 volts, if the red LED is off, the LED is not functioning.

The green LED verifies receiving the cell tower signal. With the yellow wire having positive 12 volts, blinking indicates the cell control channel signal is detected, constant indicates sending a micro burst signal (LED stays on 5 seconds after each transmission), and off indicates no cell tower signal received. With the yellow wire not having positive 12 volts, off indicates the green LED is not functioning.

An example of representative DIP switch feature selection is as follows. A first switch may be used for adding the orange wire for controlling arm/disarming of the system. When on, the orange wire controls arm/disarm as follows: to arm, the orange wire is grounded and the yellow wire does not have 12 volts positive. To disarm, the orange wire is not grounded. When the first switch is off, then only the yellow wire controls arm/disarm as follows: to arm, the yellow wire is without 12 volts positive, and 30 seconds after continued arm mode then the orange wire activates a constant 500 ma grounded output to operate an external starter interrupt relay until the system is disarmed. To disarm, the yellow wire is connected to 12 volts positive.

A main 5-pin plug may be provided on the vehicle unit and connected as follows:

9. The Red Wire is connected to the 12 vdc power. An alert warning "E" is given if the system is armed and the battery voltage becomes lower than 11 volts for longer than ## minutes. This alert feature "E" will not operate again until the voltage is above 12 volts to re-set this feature.
10. The black wire is connected to ground.
11. The yellow wire is connected to the ignition 12 volts so that if the key is on, 12 volts is supplied thereto and if the key is off, the yellow wire is connected to ground. Further: if the system is in an armed mode and the Lat/Long changes, then Alert "A" is given. If the system is disarmed and within 2.5 seconds after the yellow wire receives 12 volts and the gray wire detects 3 or more positive pulses the system activates Alert "D". If the first DIP switch is in the off position then: if 12 volts is on yellow wire, the system is disarmed and the orange wire discontinues from the 500 ma ground, and if the yellow wire sees ground or neutral, then the system is armed and 30 seconds after the continued arm mode the orange wire activates a constant 500 ma grounded output to operate an external starter interrupt relay until the system is disarmed.
12. The gray wire is for input and output, and can be connected to an alarm siren or horn positive terminal. In addition:
    a. With the system armed and if the gray wire detects +12 v pulsing on/off or on constant for more than 10 seconds from an alarm siren or horn honking activation, then alert warning "B" alarm activation is given.
    b. With system disarmed and if the gray wire detects +12 v pulsing on/off or on constant for more than 10 seconds from an alarm siren or horn honking activation, then alert warning "C" panic activation is given.
    c. With system disarmed and if the Gray wire detects 3 or more 12 volt positive pulses within 2.5 seconds of yellow wire receiving +12 v and the gray wire by-pass not being activated, then alert warning "D" is given.
    d. The gray wire bypass operates as follows:
        i. After alert warning "B" bypass all future alert "B" signals until system is disarmed.
        ii. After alert warning "C" bypass all future alert "C" signals until system is armed.
        iii. After alert warning "D" bypass all future alert "D" signals until no 12 volt pulses are detected on the gray wire within 3 seconds of the yellow wire having 12 volts.
    e. With the system armed or disarmed. The Output: Internal +12 v, 1 amp transistor with pulses 1 second on and 1 seconds off to activate siren or honk car horn or flashing light relay.
        i. Non-stop activation from (Command "4")
        ii. 30-second activation from (Command "5")
    f. Turn off the above alert "A" from (Command "1").
13. The orange wire is for the starter interrupt and arm/disarm system, and operates as follows:
    a. If first DIP switch is in the:
        i. On position and: the orange wire has 12 volts or neutral, the system switches to the disarmed mode; the orange wire is grounded, then the system is switched to the armed mode; and the starter interrupt output will not automatically operate. It can only be activated from "Command 4"
        ii. Off position and the orange wire does not effect the arming or disarming of the system; 30 seconds after system arms the orange wire will automatically activate constant 500 ma ground until the system is disarmed. And from "command #4". Connect to Starter interrupt relay output.
    b. Command 4 activates Orange wire to have 500 ma. negative until Command 1 is received.
    c. After alert warning "B" is activated the first time it is thereafter bypassed while the orange wire remains grounded. Alert warning "B" is re-set to operate again 3 seconds after orange wire becomes ungrounded.

The vehicle unit may also include a Door Lock Plug configured as follows, for example. A green wire provides a 250 ma, negative 1 second pulse for Lock Doors. (Command "6"). A red wire provides a constant 12 v output from the red power wire. A blue wire provides a 250 ma., negative 1 second pulse for Unlock Doors (Command "7"). A pink wire provides a 250 ma., negative 1 second pulse for remote Car Starter (Command "2").

An installation test button may also be provided to work as follows. Pressing the button activates the orange wire for 10-seconds (starter interrupt), with these circuits in sequence. First, it activates the gray wire for 1-second (siren/horn). After the first stops, it activates the green wire for 1 second to lock the doors. After the second stops, it activates the blue wire for 1 second to unlock the doors. After the third stops, it activates the pink wire for 1 second to activate an optional item.

Figure 6:
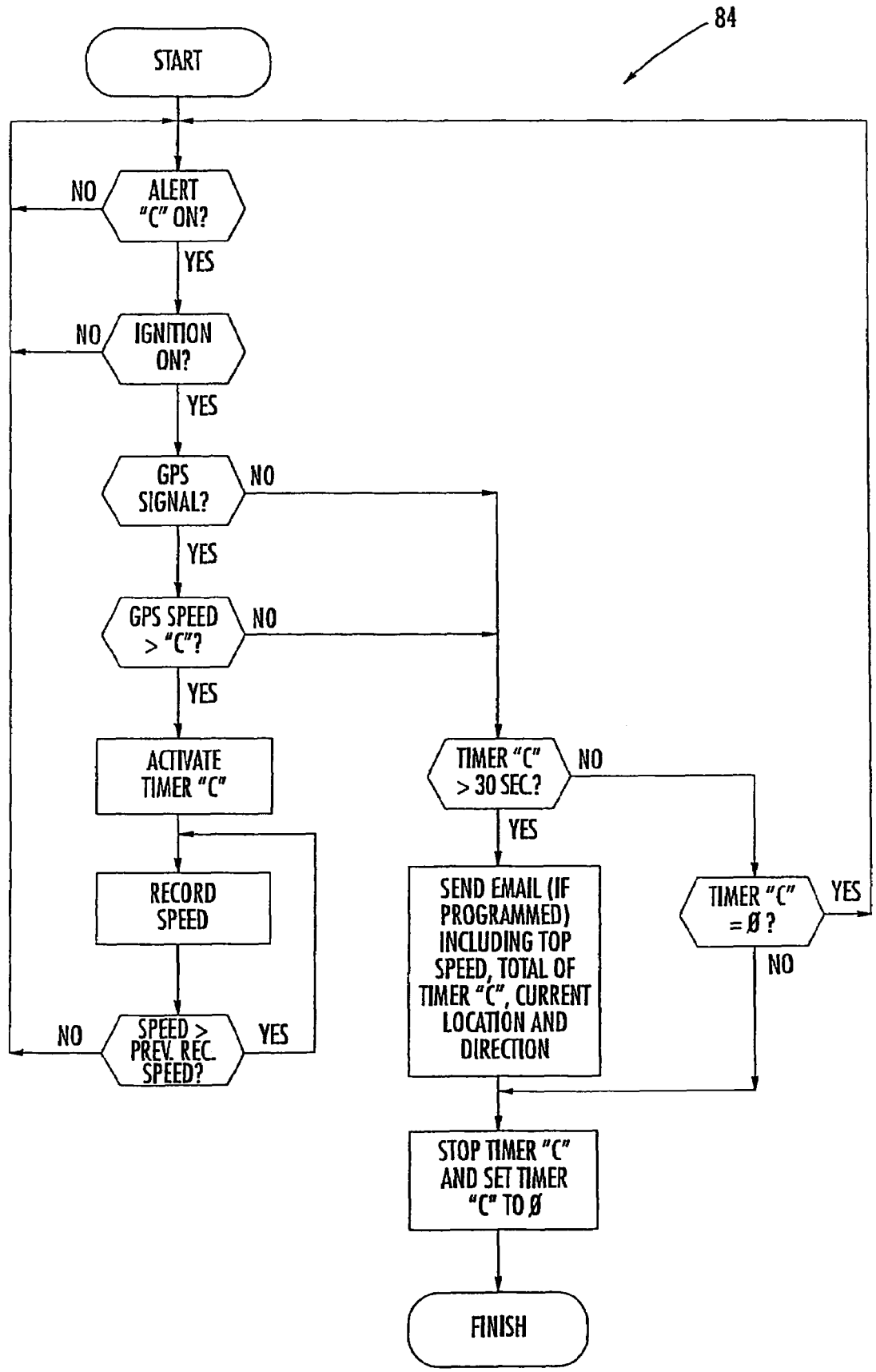
FIG. 6 is a flowchart for operation of the vehicle tracking system as shown in FIG. 1 illustrating a vehicle speeding alert.
Figure 7:
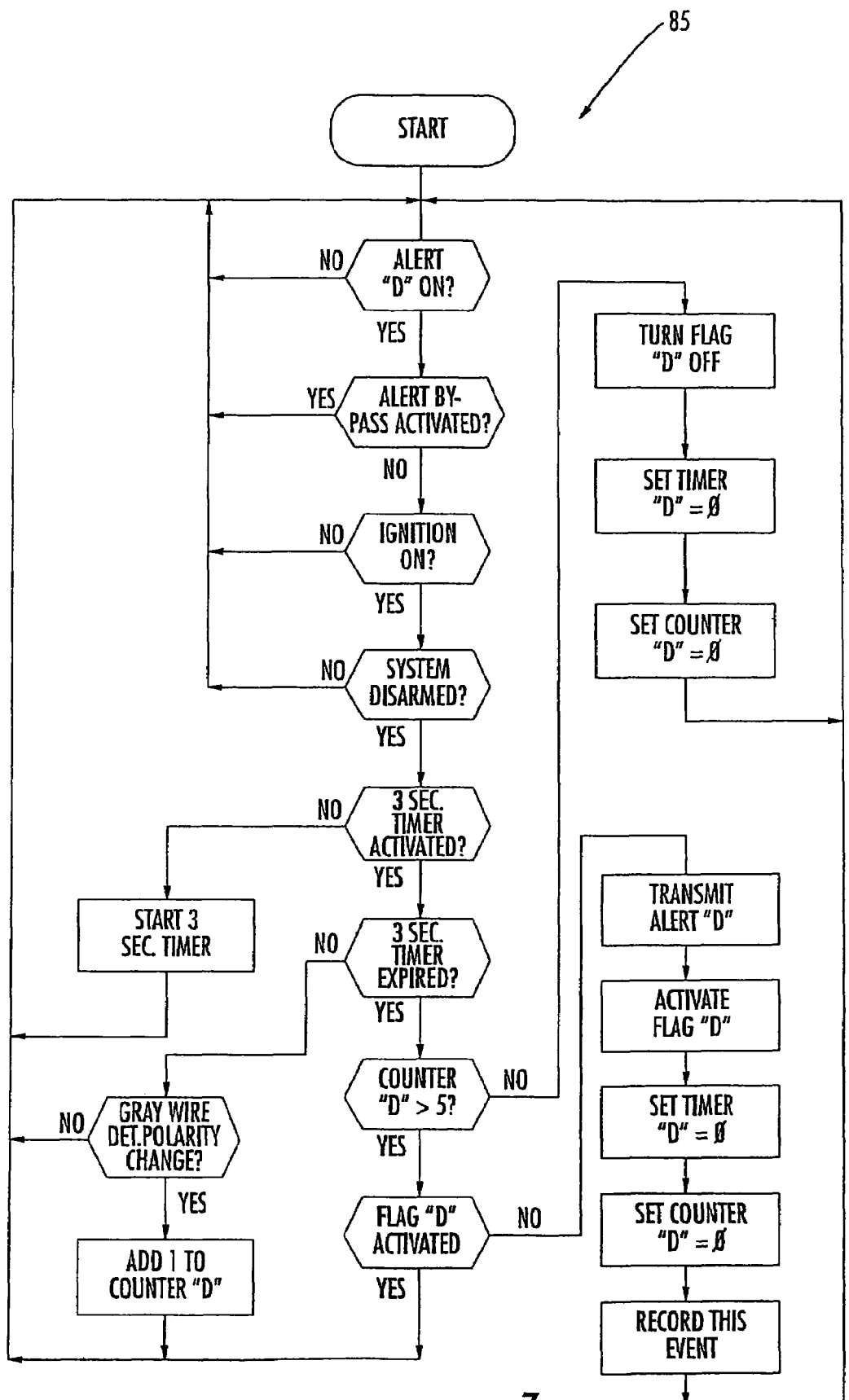
FIG. 7 is a flowchart for operation of the vehicle tracking system as shown in FIG. 1 illustrating an unauthorized transmitter learned alert.

Representative warning alerts are as follows:
14. Alert Warning "A" (FIG. 4): Automatic activation of "Command 8" and the vehicle unit contacts monitoring station to instantly call 3 phone numbers with the message "Your vehicle is stolen please confirm then call 911 to advise police of website and your pin # so police can locate the vehicle". This is detected with the system armed and the GPS indicating movement. Bypasses all future alert warning "A" signals until the system is re-armed.
15. Alert Warning "B" (FIGS. 5A-5C): the vehicle unit contacts the monitoring station to instantly call 3 phone numbers with the following message "Vehicle alarm activated please confirm". This is with the system armed and detecting gray wire having 12 volts pulsing or on constant for longer than 10-seconds. After alert warning "B" is activated the first time, it is thereafter bypassed while the orange wire remains grounded. Alert warning "B" is re-set to operate again 3 seconds after orange wire becomes ungrounded.
16. Alert Warning "C" (FIG. 6): the vehicle unit contacts the monitoring station to instantly send e-mail message "vehicle was traveling faster than your preset amount of "###" and time limit of "##" seconds. Indicates the vehicle speed and location that the speeding started and how long speeding accrued" (Detected from GPS). This aspect is further understood with reference to the enclosed flowchart 84 of FIG. 6.
17. Alert Warning "D" (FIG. 7): the vehicle unit contacts the monitoring station to instantly call 3 phone numbers with the message "Unauthorized remote transmitter was just programmed to operate your vehicle." This is with the system disarmed and the Gray wire detecting three or more 12 volt pulses within 2.5 seconds of the yellow wire having seen 12 volts positive. All future alerts. "D" are bypassed until no 12 volt pulses are detected on the gray wire within 3 seconds of the yellow wire seeing 12 volts. This aspect is further understood with reference to the enclosed flowchart 85 of FIG. 7.
18. Alert Warning "E" (FIG. 8): the vehicle unit contacts the monitoring station to instantly call 3 phone numbers with the message "Vehicle has low battery voltage and system has changed to low voltage mode". This is with the system armed and detecting the red wire with lower than 11 volts for ## minutes. All future alerts "E" are bypassed until, first, more than 13.5 volts are detected on the red wire and, second, after the yellow wire stops having positive voltage the red wire then must detect more than 12 volts.

The following are representative commands for use in the system:

Command 1: Reset all circuits and system remains asleep until the ignition key is turned on. Resets the triggered mode and unit is asleep to prevent power drain on vehicle battery.

Command 2: (Accessory activation) monitoring station Command to the system to activate Pink wire to pulse 250 ma negative for 1 second.

Command 3: (Vehicle Location) website to indicate present location and past events in memory.

Command 4: (Hijack or Stolen) monitoring station Command to vehicle system to activate:
 a. Gray wire to pulse 1 sec on/1 sec off with 1 amp positive output and which continues until receive command #1.
 b. Orange wire to have 500 ma ground and which continues until receive command #1.

Command 5: (Car Find) monitoring station Command to system activating Gray wire for 30 seconds pulsing 1 sec on/1 sec off with 1 amp positive output.

Command 6: (Lock Doors) monitoring station Command to system activating Green wire to pulse 1 second with 250 ma negative.

Command 7: (Unlock Doors) monitoring station Command to system to activate Blue wire to pulse 1 second with 250 ma negative.

Command 8: (Start Constant Vehicle Tracking) sends previous 2 events in memory and then every 120 seconds get update of location information sent to the Web site.

The system is also operable in a battery saver mode which operates as follows:

19. With the ignition key off, if the battery voltage drops below 11.5 volts for more than 5 seconds, the GPS verification wakes up to look:
 a. Once instantly.
 b. Once in 1 hour if at the same location.
 c. Once in 6 hours if at the same location.
 d. Once in 12 hours if at the same location.
 e. Once every 24 hours if at the same location.
 f. Activate alert "E" when the battery saver mode is activated, and bypass sending all future Alert "E" until the battery voltage goes above 13 volts for 10 minutes to reset this feature.

Another aspect of the invention relates to automatic vehicle alert e-mails sent containing some or all of the previous system events. This sending can be triggered as follows:
 a) At a user selected predetermined time ## (01-24) of each day, or
 b) At a predetermined memory fill level, such as full or near full.

In addition, each system event may contain one or more of the following:
 c) Vehicle Location
 d) Vehicle total time at location
 e) Time of day
 f) Mph traveling
 g) Total time traveling above MPH
 h) Direction traveling
 i) Delta
 j) Special Alert messages, if any, including:
 k) GPS signal not received for longer than 5 minutes.
 ii) Traveling above ###MPH for ## minutes.
 iii) Vehicle is stolen.
 iv) Alarm activated.
 v) Unauthorized remote transmitter alert.
 vi) Battery saver mode activated
 vii) Command 1: Reset all circuits and system remains asleep until the ignition key is turned on.
 viii) Command 2: (Accessory activation)
 ix) Command 3: (Vehicle Location was retrieved)
 x) Command 4: (Hijack or Stolen mode activated)
 xi). Command 5: (Car Find mode activated)
 xii) Command 6: (Locked Doors)
 xiii) Command 7: (Unlocked Doors)
 xiv) Command 8: (Started 2-second incremental Vehicle Tracking)

Another feature of the invention relates to the selectable threshold conditions causing an event to be recorded into the memory of the vehicle unit. For example, this may include: while the yellow wire has 12 volts, record events every "??" default 15 minutes time if the GPS location has changed. If the GPS location is the same then only update stationary total time. If the GPS antenna is not receiving any signal then enter last known GPS location and with an indication that this was the last known GPS location before the GPS signal stopped, how long no GPS signal was received, and the GPS location in the on-hold file, when the vehicle is traveling above ### MPH for ##-minutes.

The monitoring station may also provide a number of automated phone calls as described above. These may include:

20. The user's vehicle has issued a stolen alert:
 a. If vehicle is stolen, after receiving the phone message the user then calls 911 to advise police of the theft, and gives the police the website address and an identification number, such as the user's PIN, to allow the police to locate where your vehicle has been, where it is now and keep tracking it until the police can retrieve the vehicle.
 b. If this is a false alert due to vehicle being towed away for service, for example, then the user may press "1" to put the vehicle in an off mode. Once the ignition key is turned on again the system will reset back to its normal operation mode.

21. The user's vehicle has issued an alarm activated for more than 10 seconds alert. The system will not respond to this alert again until ignition key is turned on again to reset this feature.

22. The vehicle battery voltage is low or has been disconnected. The tracking system is in low voltage mode. The system will not respond to this alert again until the battery voltage goes above 13 volts for 10 minutes to reset this feature.

The backup battery may be sized according to the GPS receiver and processing power draw. In addition, the battery may also be sized based upon estimated micro burst transmitting power draw. Such transmissions are typically at about 3 watts power to the antenna.

The system according to the invention including the vehicle unit and monitoring station provides a number of significant advantages and features. For example, the police may be directly contacted by the user when the vehicle is stolen. The user receives the telephone message from the monitoring station, and this is done without requiring the intervention of a manual security monitoring operator, such as an ADT operator, for example. In addition, once in the stolen mode, the vehicle unit will periodically continue to send out its location, so that the police may track the vehicle via the WEB, for example. This location sending feature may begin immediately, that is, without requiring the user to contact the vehicle to begin tracking. Having the vehicle contacting the monitoring station is considerably less expensive than other schemes where the vehicle is periodically polled via the cellular network, for example.

The system may also be interfaced to a breath alcohol sensor at the vehicle, for example, and this information recorded in memory. The information could be passed along to the monitoring station, which, in turn, could send out a notification message (e-mail or telephone) that the vehicle is being operated by a driver who may be impaired by alcohol. The vehicle's location could then be tracked to permit the police to detain the driver.

Another aspect of the unit is that it may be able to recognize the desirability to bypass certain security breach triggers or other events. For example, a car finding feature can be provided that will allow the user to sound the horn or siren when near the vehicle to help locate the vehicle, as in a crowded parking area. Without the bypass feature, the unit could recognize the horn or siren as a security breach and transmit such information to the monitoring center. In accordance with this aspect of the invention, the unit would recognize the car finding feature was activated and thereby bypass sending a security breach transmission, for example. Again, false alarms and unneeded usage and expense of the communications infrastructure would be avoided.

Figure 4:
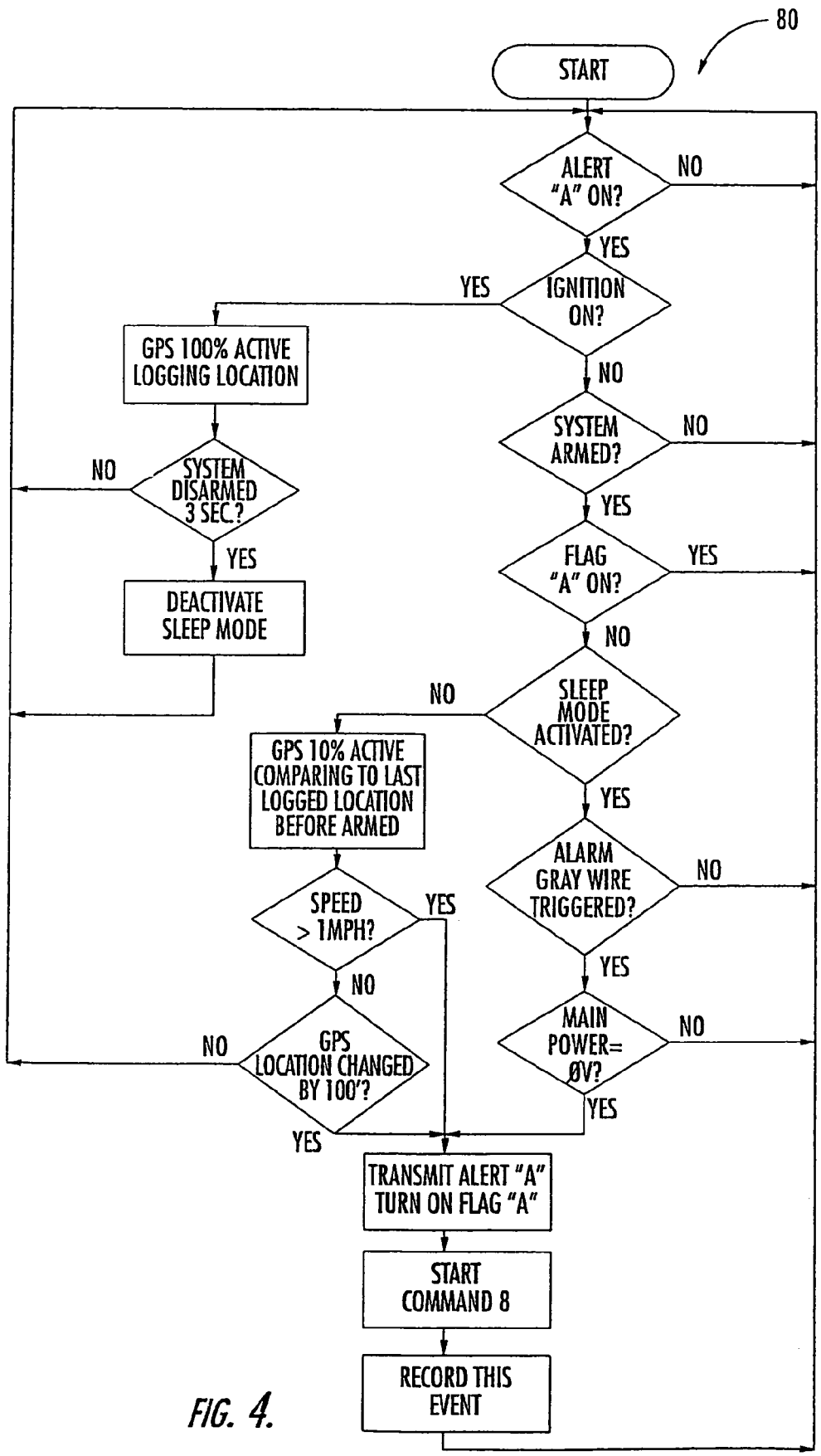
FIG. 4 is a flowchart for operation of the vehicle tracking system as shown in FIG. 1 illustrating a vehicle stolen alert.

Yet another aspect of the invention relates to thwarting a would-be thief who attempts to disable the alarm by cutting the battery cable or power supplied to the system. The unit preferably includes a back-up battery. More particularly, upon being in an armed mode and sensing a breach of security, such as the hood opening, for example, the unit will send out a signal indicating the alarm or security breach and while the alarm is indicated, if the battery is disconnected then the unit will send out a message indicating the vehicle is stolen, and also providing the vehicle's current position. Accordingly, the would-be thief is not able to defeat the security system by quickly disrupting power to the unit during an alarm indication or security breach. Also, to prevent additional alerts, this message is prevented from being transmitted again until the user returns to the vehicle to disarm the system and/or turn on the ignition so that the unit sees a voltage above 13 volts, indicating the vehicle has started using the owner's ignition key. This aspect is further understood with reference to the enclosed flowchart 80 (FIG. 4).

Still another aspect of the invention relates to how the unit can discriminate between ordinary usage or honking of the horn as compared to a security system triggered alarm. Most vehicle security systems will provide a pattern of horn soundings as an alarm indication, and this can be determined and used to reduce false alarm transmissions from the unit. For example, the unit can look at the number of leading and trailing edges of the power pulse used to sound the horn. A single pressing of the horn switch by the user will cause two edges within a predetermined time, such as about 10 to 12 seconds. Accordingly, the unit can be configured to not send a security breach transmission to the control center based upon detecting two transitions. Since a number of vehicle security systems may have a continuous sounding of the horn within the predetermined time, the unit can send the transmission upon detecting only a single transition.

Figure 5A:
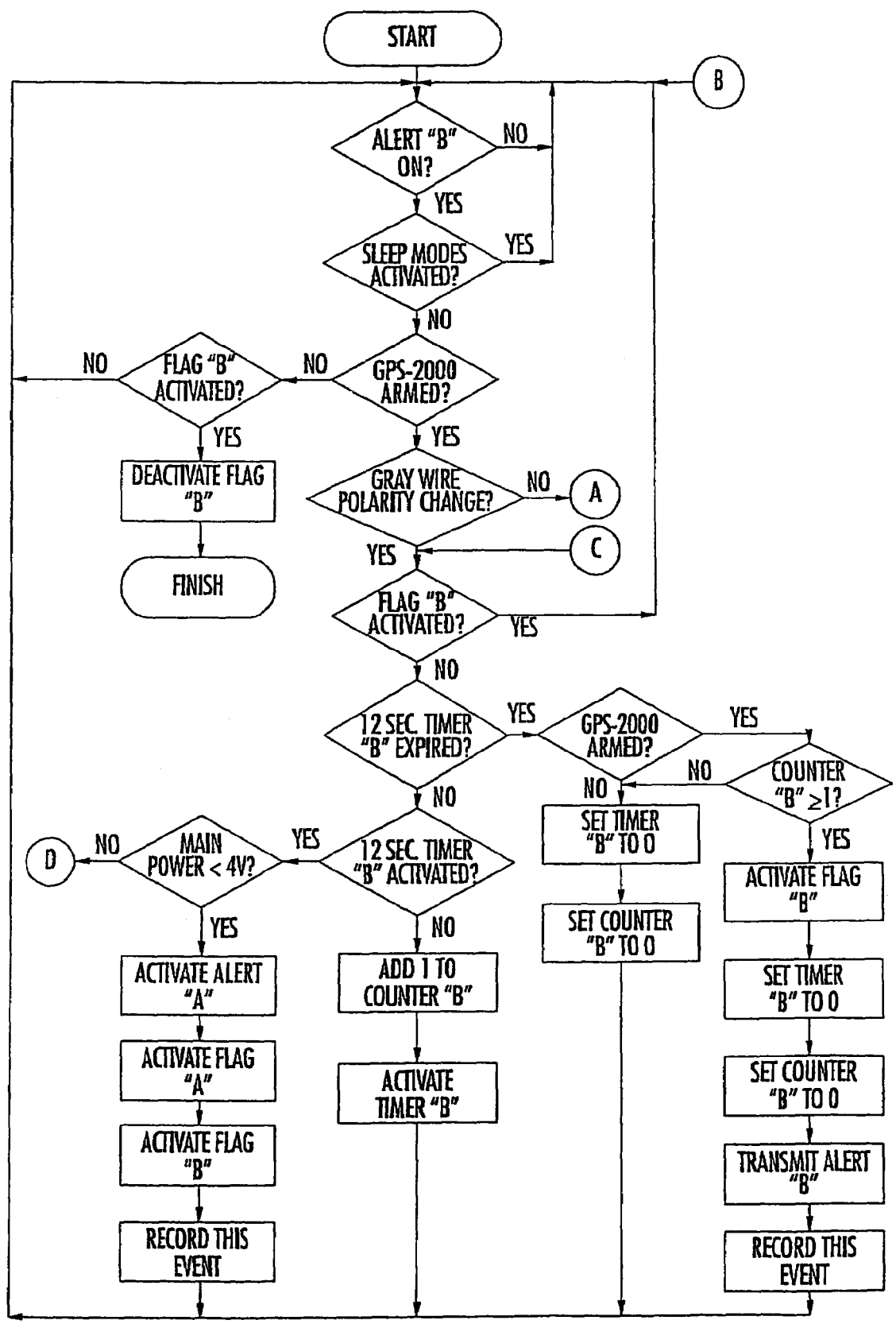
FIGS. 5A-5C are a flowchart for operation of the vehicle tracking system as shown in FIG. 1 illustrating a vehicle alarm sounding alert.
Figure 5B:
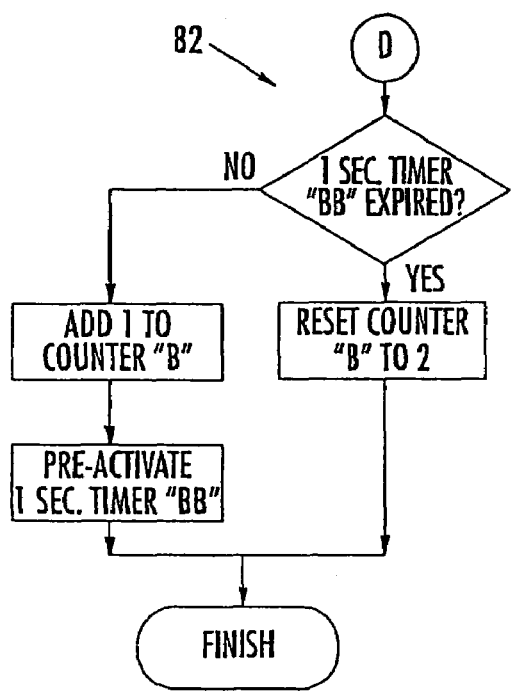
Figure 5C:
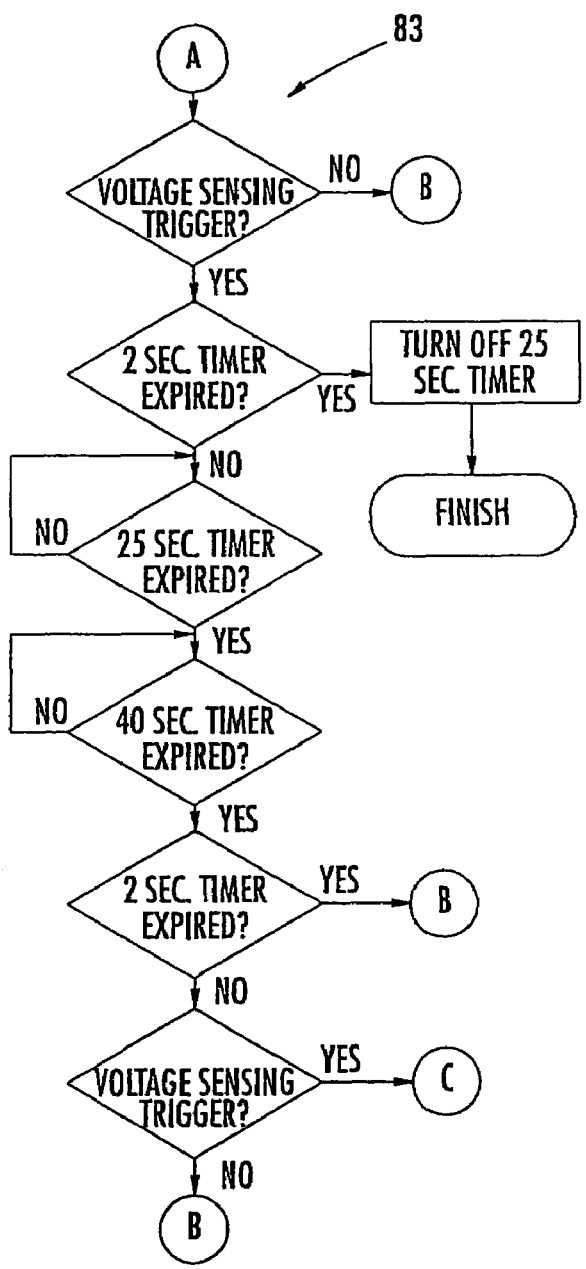

A number of other vehicle security systems provide a series of pulses or horn soundings within the predetermined time. Accordingly, the unit may also be configured to send a security breach transmission upon detecting greater than a predetermined number of transitions, such as greater than nine, for example. This number is also typically higher than a user would generate honking the horn several times within the predetermined time. In other terms, the number of transitions of the horn pulses can be counted, and if equal to one, or greater than nine, for example, the transmission is triggered, and otherwise the sounding of the horn is ignored. Also, to prevent additional alerts, this message is prevented from being transmitted again until the user returns to the vehicle to disarm the system and/or turn on the ignition so that the unit sees a voltage above 13 volts, indicating the vehicle has started using the owner's ignition key. This aspect is further understood with reference to the enclosed flowcharts 81-83 (FIGS. 5A-5C).

Figure 8:
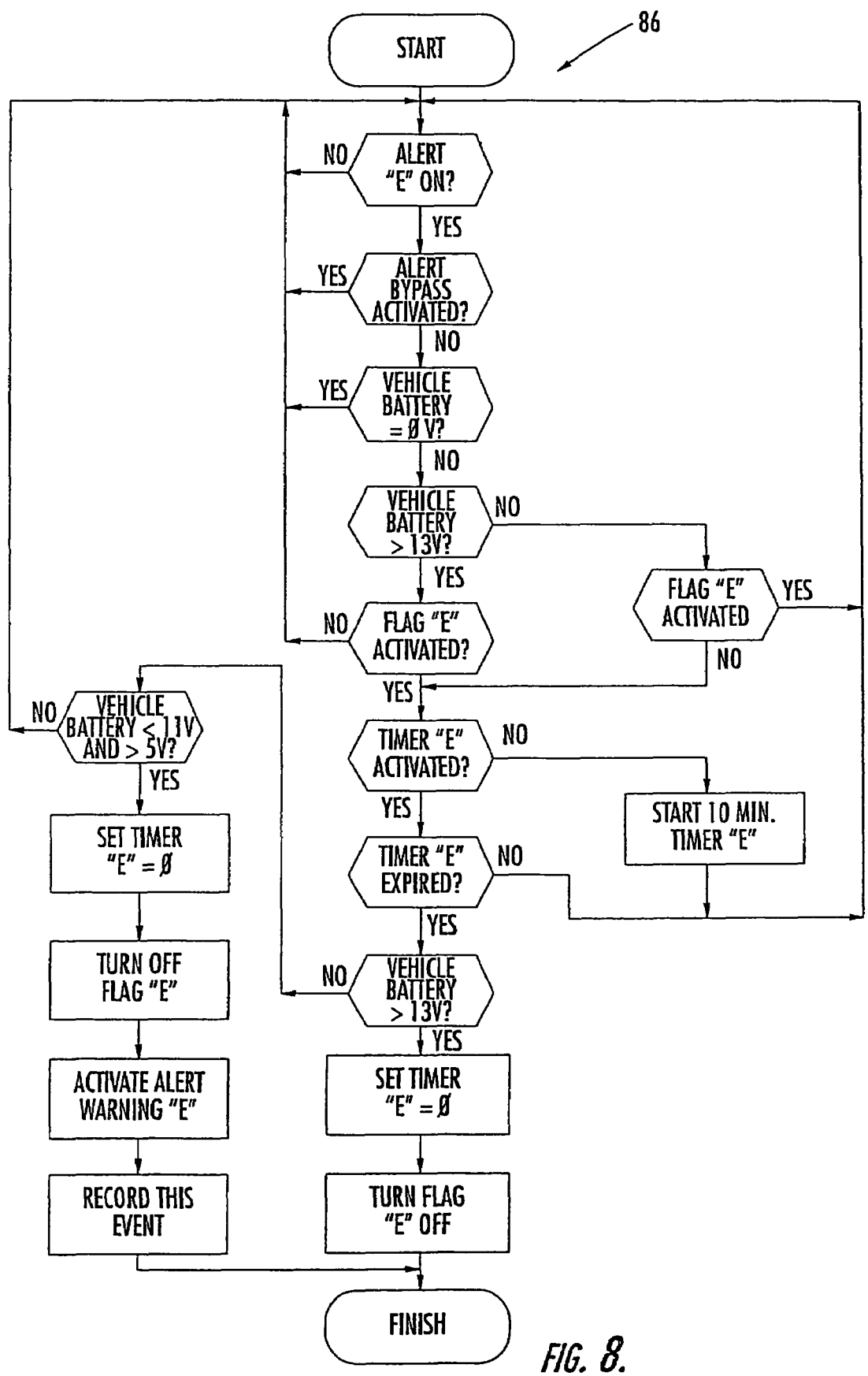
FIG. 8 is a flowchart for operation of the vehicle tracking system as shown in FIG. 1 illustrating a low battery alert.

Yet another feature of the invention relates to a low vehicle battery alert. For example, the unit may monitor the battery voltage over a predetermined time such as ten minutes. The ten minute window prevents false tripping, for example, when the voltage dips during engine cranking. In particular, the voltage can be sensed and it can be determined whether it is greater than zero (e.g. greater than six volts) and less than a high value (e.g. eleven or twelve volts), and, if so, a low battery voltage transmission can be communicated to the monitoring station, and ultimately to the vehicle user when away from the vehicle. If the vehicle is being serviced and the battery is disconnected, this will cause the battery voltage to be equal to zero. Then, the low battery voltage transmission will not be communicated to the monitoring station. Also, to prevent additional alerts, this message is prevented from being transmitted again until the user returns to the vehicle to disarm the system and/or turn on the ignition so that the unit sees a voltage above 13 volts, indicating the vehicle has started using the owner's ignition key. Again, false triggerings are reduced. This aspect is further understood with reference to the enclosed flowchart 86 (FIG. 8).

Yet another advantageous feature of some embodiments of the invention relates to the ability to conserve electrical power. More particularly, when the vehicle is stopped and in the armed mode, the GPS receiver may be periodically operated to determine the vehicle position. If the vehicle position changes, this is indicative that the vehicle is being moved or stolen. For example, the GPS receiver may be operated to generate new vehicle position information every 29 seconds. These relatively quick successive position determinations or readings are generally termed hot start. These are relatively less complicated than a cold start position determination which takes longer, since the cold start position determination requires greater time to acquire and receive data from multiple satellites, as will be appreciated by those skilled in the art.

Unfortunately, this relatively high repeated usage of the GPS receiver may cause unnecessary battery drain, especially when the vehicle is left armed and unattended by the user for an extended period. Accordingly, the power conserving feature of the invention permits the GPS receiver to be turned off when the vehicle is in the armed mode, and the GPS receiver is turned on only when needed. For example, a vehicle sensor, such as a shock sensor, motion sensor, ignition sensor, door sensor, or other sensor, or combinations thereof could be used to start the GPS receiver. This sensor could also be used to trigger an alarm if desired; however it need not be so used in all embodiments. The GPS receiver, once turned on, could operate in the normal periodic fashion as described above, or for a fixed period of time. The GPS receiver could also be turned off again after some predetermined time if no further sensor signal is received, or if the position fails to change on subsequent position readings or determinations.

Yet another feature relates to permitting more colorful audible alert messages to be generated for the user. The user can, in some embodiments, access an internet site to type or enter the text for a message to be sent, such as to alert the user that his vehicle is being stolen. The audible message then communicated by a telephone call to the user is generated by a speech message synthesizer based upon the entered text. In accordance with this aspect of the invention, the user could type in phonetically spelled words or phrases, such as to create more colorful messages including slang terms, various accents, and/or to mimic various dialects, for example. The speech synthesizer would then generate the desired message customized for the user. Of course, the system could also permit the user to test or preview the pronunciation generated by the speech message synthesizer based on the entered text message prior to its adoption.

Another aspect relates to requesting GPS position information from a vehicle. If a command is sent downstream to the vehicle requesting that GPS information in turn be sent upstream from the vehicle, and the GPS information is not received within a predetermined time, such as about four minutes, then another command may be sent to the vehicle requesting the GPS information. This may keep repeating until GPS information is received, for a predetermined number of tries, or until a user instructs stopping of the requests. This helps to ensure and confirm the activation and reception of GPS tracking coordinates from the vehicle.

Yet another aspect relates to reducing a frequency with which GPS information is sent from the vehicle. More particularly, the unit may be configured to activate GPS information transmission upstream every 2 minutes. To reduce system usage expense and power consumption at the vehicle, this rate of transmission of GPS information could be progressively decreased over time. For example, in one embodiment, upon activation the GPS location signals could be sent every 2 minutes during the first hour, then once an hour for the next 23 hours, after which only one signal would be sent per day.

Figure 9:
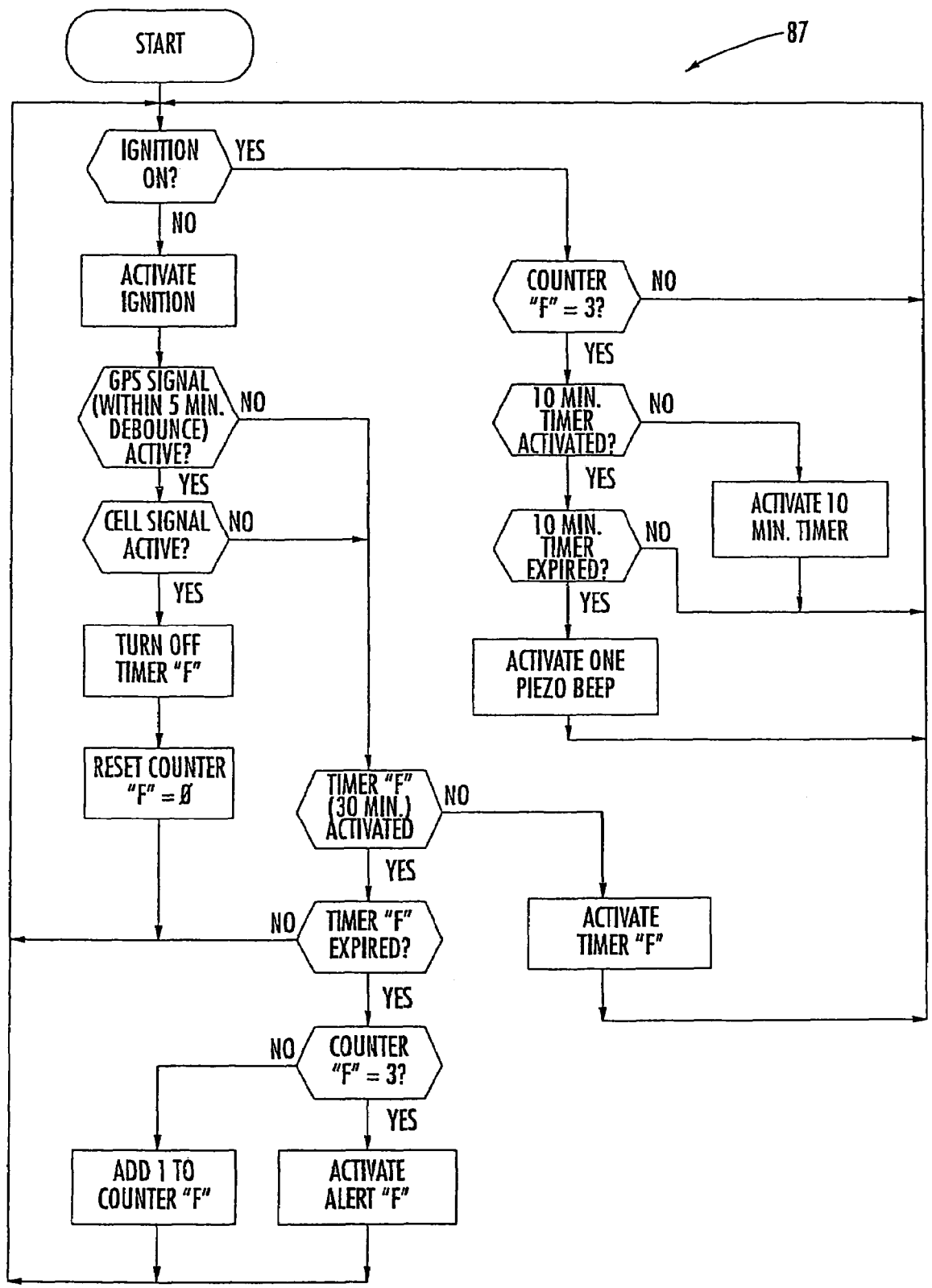
FIG. 9 is a flowchart for operation of the vehicle tracking system as shown in FIG. 1 illustrating a GPS or cellular unit failure alert.

Turning now to the flowchart 87 of FIG. 9, still another aspect relates to warning the user of an inoperable or malfunctioning GPS or cellular telephone section. More particularly, if the GPS or cellular telephone antenna wire is cut or the mounting position of either is changed causing the antenna to stop receiving the signal the user would not ordinarily know of this problem quickly. In accordance with one embodiment, if the ignition is turned on a predetermined number of times, such as about three, and each time ignition turns on if no GPS or no cell signal is received for a minimum time, such as about 15 to 30 minutes or longer, an audible warning beeper may be activated in the vehicle. This beeper may be sounded once every 15-minutes. At anytime if the GPS or cell signal is received properly then the system re-sets automatically stopping the beeper sound.

As an example, if the ignition key is turned on and no GPS or no Cell signal is being received for 15-minutes, and the vehicle ignition stays on for 45-minutes and there is still no GPS or no cell signal, the unit counts one. Thereafter, if the ignition key is turned on and no GPS or no cell signal is being received for 15-minutes, and the vehicle ignition stays on for 60-minutes and there is still no GPS or no cell signal, a second count is determined. Thereafter, if the ignition is:turned on and no GPS or no cell signal is received for 10-minutes, and the vehicle ignition stays on for only 10-minutes and there is still no GPS or no cell signal, no count is determined. Thereafter, if the ignition is turned on and no GPS or no cell signal is being received for 15-minutes, a third count is determined and the beeper is activated as described above. This beeping may continue every 15-minutes while the vehicle ignition stays on as long as the vehicle ignition stays on for 16-minutes and still no GPS or no Cell signal is being received. If thereafter, the ignition is turned on and no GPS or no cell signal is being received, the beeper beeps once and again beeps once every 15-minutes while vehicle ignition stays on. If in 10-minutes both GPS or cell signal is being received, the beeper system is turned off and the warning count is reset.

By way of example, if the ignition key is turned on and no GPS or no cell signal is being received for only 5, 10 or 12 minutes (with the threshold set at 15 minutes), then no count is determined.

In certain circumstances, the GPS signal may fail, but the cell signal may still be working. Accordingly, it may be desirable to send an indication of the failure of the GPS signal to the central monitoring station to thereby alert the user as described above. If the cell signal also failed, or if the cell signal failed by itself, in other embodiments a separate paging device would transmit the failure or loss of the cell signal information to the central monitoring station, to thereby alert the user.

Yet another feature is directed to efficient use of a relatively small number of codes available to communicate with the tracking unit from the cellular network and central station. More particularly, a typical arrangement may provide eight basic codes and two A wildcard@ codes. The two wildcard codes are reserved for future or other uses. A particular tracking device will respond directly to any of the eight basic codes. For example, the doors could be locked or unlocked, a present location downloaded from the vehicle, etc.

In accordance with this feature, the tracking device may respond differently to the same code or command depending upon the state or condition of the tracking device. For example, if an alarm is triggered at the vehicle, it may be desired that the tracking device continue to send the alarm signal until confirmation is received that the central monitoring station has received the alarm signal. This confirmation can be sent using the same code as may provide another function if the device were not indicating an alarm. Any of a number of such tracking device conditions may trigger a different message to be interpreted from the received code. For example, if any of the above Alerts A-E were triggered, the receipt of a predetermined code, such as code eight, would confirm receipt of the alert by the central station, and this receipt of code eight would not cause the other response (no alarm triggered) in the tracking device. Of course this concept can be extended to other features as will be appreciated by those skilled in the art.

In accordance with another feature, the rate of sending the location or position data (or change in position data) from the vehicle may be varied to reduce system usage and thereby reduce expenses. More particularly, in one embodiment, the rate of sending may be based upon how long the vehicle has remained stationary. This time period may be selected by the user. For example, the selected time may be in the range of 15 minutes to six hours. If the vehicle has been stationary for the selected time period, then the rate of transmission may be reduced. This reduces or eliminates the need to send home position data and send all the over 15-minute stops made that day. Otherwise, that is when the vehicle is moving, the device may send data at a faster rate. Of course, a system user would not likely be interested in quick updates, especially where the position information is not changing. Conversely, if the vehicle is being moved, it may be desirable to receive more frequent position updates.

Another variation of this transmission rate conservation feature bases the rate of transmission on the vehicle position. For example, a reduced rate of transmission may be selected if the vehicle is in a predetermined area where the user has a lesser interest in quickly updated position information. The user may also have a reduced interest in an area that can be defined outside of a predetermined distance from a reference point.

Yet another variation of the vehicle position transmission rate conservation feature is based upon the vehicle's speed, such as the vehicle's average or maximum speed, for example. Accordingly, if the vehicle is traveling above a preset speed, the rate of transmission may be increased.

In accordance with another aspect of the invention, the tracking device may send the alert indication a predetermined number of times without receiving an acknowledgment as described above, and then wait until the vehicle position has changed before trying again or the cell re-registers or its RSS (received signal strength) changes. Thus, power is conserved. When the vehicle has moved to a new position, any obstructions may no longer be present thereby increasing the likelihood of a successful communication. In addition, the change in position may be determined when the vehicle is sensed to be moving about a predetermined relatively small speed, such as greater than 1 mph, for example.

In all of the embodiments and variations described herein, the tracking device may communicate with one or more other vehicle devices via a vehicle data communications bus. Further aspects of interfacing with a vehicle data communications bus are described in U.S. Pat. Nos. 5,719,551 and 6,011,460 assigned to the assignee of the present invention.

Yet another aspect relates to efficient use of available codes on the cellular telephone control channel. In one particular example, ten codes may be available to be transmitted from the monitoring station to the vehicle trackers. The first eight or nine codes are command codes that will cause a specific action by the tracking device at the vehicle. The other one or two codes may be wildcard codes as mentioned above, that may set a stand-by mode for one or a group of vehicles, for example.

It may be desirable to provide more than eight commands at the vehicle responsive to the corresponding eight available codes. For example, it may be desirable to set a feature on or off, or to set a different feature setting or threshold. In accordance with this aspect of the invention, the commands at the tracker are determined based upon a series of different command codes being received within a predetermined time window.

For example, the monitoring station may send code 9 that switches the tracker in the car into a stand-by mode for a predetermined time and which causes the tracker to respond with an upstream confirmation code 7 or 9 indicating receiving code 9. During the predetermined time of the stand-by mode another code follows that causes a system programmable feature or setting to change. Note that the second code would otherwise cause a different function at the vehicle. Note that system might operate a function 9 if another code 1-9 is not received in the predetermined time. The following list is exemplary for features resulting from second codes 1-9:

(1) Code 1—Tracker will turn off feature of upstream code caused by vehicle alert being detected.
(2) Code 2—Tracker will turn on feature of upstream code caused by vehicle alert being detected.
(3) Code 3—Tracker deactivates cell receiver from operating due to a non-paying customer for monitoring service. That phone number can then be allocated to another customer.
(4) Code 4—Turn on audio buzzer feature that will sound once each 10 minutes. The monitoring station need only send the command to activate the feature, as the tracker will time the period and drive the buzzer thereafter. The monitoring station will normally not need to send this command because the tracker will be configured out of the box with this feature activated to sound the buzzer every 10 minutes until the next command is received.
(5) Code 5—Turn off the audio buzzer. This is to be sent by the monitoring station after a user has successfully activated his account.
(6) Code 6—Turn on the 80 mph speed limit reporting. This will normally not be sent as this feature will be the default setting of the tracker.
(7) Code 7—Turn off the 80 mph speed limit reporting.
(8) Code 8—Increase speed limit 5 mph and increase the time 5 minutes.
(9) Code 9—Decrease speed limit 5 mph and decrease the time 5 minutes, and wait 5 minutes if another code number follows. It could operate this way to allow another set of codes to change more features.

In this example, in response to the tracker receiving the system code 1-9, the tracker sends an upstream code 7 to acknowledge receipt of the system code 1-9. Upon receipt of code 9 the tracker waits up to 5 minutes to determine if another system code is received. If no code is received, then the tracker performs the code 9 operation. Of course, in other embodiments other features or settings can be selected.

In general, it may be preferred that the first code sent in a series of two codes, for example, be a code that causes only a minor function to be performed at the vehicle. This is so because if the second code is sent from the monitoring station, but not received at the tracker, only a minor function is performed. For example, the first code may switch between armed and disarmed modes. This is in contrast to using a remote engine starting code or engine shutdown code as the first code. The vehicle may be moving or positioned in a marginal reception area, and the second command may not be received by the tracker within the predetermined time window. As will be appreciated by those skilled in the art, this concept of multiple digit codes, can be extended beyond two digits to three or more.

To further conserve cellular transmissions and as described above, the tracker may be set to record a position based upon a determined event. Only this recorded position information may be downloaded either by user request or at set times. It is desired that such events be relatively few, but that the information still be helpful to the user.

For example, an event for recording of position may be determined based upon the vehicle being stopped for greater than a first time and less than a second time. For example, the first time may be 15 minutes and the second time may be 6 hours. Determination of the vehicle being stopped can be made based upon one or both of the GPS position or the vehicle ignition being turned off. The second time prevents the recording of position information when the vehicle is stopped at the owner's home during the evening, for example. Accordingly, the important information of the vehicle stops being made is recorded and made available to the user, while system communications resources are conserved.

In another example, if the mode is selected to send the vehicle's location every 10 min and the vehicle is in the same location for greater than a set time, then no more vehicle locations are sent until the vehicle location has changed to start the every 10 min reporting again.

Other features relating to vehicle control systems are disclosed in copending patent applications entitled VEHICLE TRACKER INCLUDING STATIONARY TIME DETERMINATION AND ASSOCIATED METHODS, Ser. No. 09/859,727 filed May 17, 2001, now U.S. Pat. No. 6,512,465; VEHICLE TRACKER CONSERVING CODES AND RELATED METHODS, Ser. No. 09/859,673 filed May 17, 2001, now U.S. Pat. No. 6,522,267; VEHICLE TRACKER WITH POWER SAVING FEATURES AND RELATED METHODS, Ser. No. 09/859,728 filed May 17, 2001, now U.S. Pat. No. 6,512,466; VEHICLE TRACKER COOPERATING WITH A STARTER INTERRUPT AND RELATED METHODS, Ser. No. 09/859,973 filed May 17, 2001; VEHICLE TRACKER WITH USER NOTIFICATIONS AND ASSOCIATED METHODS, Ser. No. 09/859,733 filed May 17, 2001, now U.S. Pat. No. 6,509,868; VEHICLE TRACKER WITH USER REGISTRATION REMINDER AND RELATED METHODS, Ser. No. 09/859,971 filed May 17, 2001, now U.S. Pat. No. 6,507,786; VEHICLE TRACKER INCLUDING INPUT/OUTPUT FEATURES AND RELATED METHODS, Ser. No. 09/859,972 filed May 17, 2001, now U.S. Pat. No. 6,606,561; and VEHICLE TRACKER WITH TEST FEATURES AND RELATED METHODS, Ser. No. 09/859,729 filed May 17, 2001, now U.S. Pat. No. 6,809,659, the entire disclosures of which are incorporated herein by reference.

Many modifications and other embodiments of the invention will come to the mind of one skilled in the art having the benefit of the teachings presented in the foregoing descriptions and the associated drawings. Accordingly, it is understood that the invention is not to be limited to the embodiments disclosed, and that other modifications and embodiments are intended to be included within the spirit and scope of the appended claims.

That which is claimed is:

1. A tracking unit for a vehicle comprising:
a vehicle position determining device;
a wireless communications device;
a controller cooperating with said wireless communications device and said vehicle position determining device to determine and send vehicle position information to a user, said controller configured to store a user selected reference location; and
at least one input device to be positioned within the vehicle for setting the user selected reference location;
said controller configured to send the vehicle position information based upon the vehicle moving beyond a radial threshold distance from the user selected reference location;
said controller configured to send the vehicle position information a threshold time after the vehicle moves beyond the radial threshold distance from the user selected reference location if the vehicle has not moved back within the radial threshold distance;
said at least one input device permitting user setting of the threshold time, and the threshold time being set by at least one of a user remote signal and said at least one input device.

2. The vehicle tracking unit according to claim 1 wherein the radial threshold distance is less than five miles.

3. The vehicle tracking unit according to claim 1 wherein the threshold time is less than about thirty minutes.

4. The vehicle tracking unit according to claim 1 wherein said at least one input device comprises at least one of a switch, a keyboard, and a keypad.

5. The vehicle tracking unit according to claim 1 wherein said controller comprises at least one memory for storing the user selected reference location and vehicle position information therein.

6. The vehicle tracking unit according to claim 1 wherein said at least one input device cooperates with said vehicle position determining device and said controller is configured to set a current vehicle position as the user selected reference location.

7. The vehicle tracking unit according to claim 1 wherein said controller is also configured to set the user selected reference location based upon at least one signal provided remotely.

8. The vehicle tracking unit according to claim 7 wherein said controller cooperates with said vehicle position determining device to set a current vehicle position as the user selected reference location based upon the at least one signal provided remotely.

9. The vehicle tracking unit according to claim 1 wherein said vehicle position determining device comprises a Global Positioning System (GPS) device.

10. A tracking unit for a vehicle comprising:
a vehicle position determining device, a wireless communication device, and a controller cooperating with said wireless communications device and said vehicle position determining device to determine and send vehicle position information to a user;
said controller configured to store a user selected reference location;
said controller also configured to send the vehicle position information based upon the vehicle moving beyond a radial threshold distance from the user selected reference location;
said controller configured to send the vehicle position information a threshold time after the vehicle moves beyond the radial threshold distance from the user selected reference location if the vehicle has not moved back within the radial threshold distance; and
at least one input device to be positioned within the vehicle for setting the user selected reference location.

11. The vehicle tracking unit according to claim 10 wherein the radial threshold distance is less than five miles.

12. The vehicle tracking unit according to claim 10 wherein the threshold time is less than about thirty minutes.

13. The vehicle tracking unit according to claim 10 wherein said at least one input device also permits user setting of the threshold time.

14. The vehicle tracking unit according to claim 10 wherein said at least one input device comprises at least one of a switch, a keyboard, and a keypad.

* * * * *

UNITED STATES PATENT AND TRADEMARK OFFICE
CERTIFICATE OF CORRECTION

PATENT NO. : 7,502,687 B2
APPLICATION NO. : 11/076570
DATED : March 10, 2009
INVENTOR(S) : Kenneth E. Flick It is certified that error appears in the above-identified patent and that said Letters Patent is hereby corrected as shown below:

| | |
|---|---|
| Column 4, Line 21 | Delete: "embodiments of"<br>Insert: -- embodiments. Of -- |
| Column 6, Line 12 | Delete: "the.control-"<br>Insert: -- the control- -- |
| Column 11, Line 43 | Delete: "electable"<br>Insert: -- selectable -- |
| Column 14, Line 58 | Delete: "alerts. "D""<br>Insert: -- alerts "D" -- |
| Column 19, Line 57 | Delete: "is:turned"<br>Insert: -- is turned -- |

Signed and Sealed this

Seventeenth Day of November, 2009

David J. Kappos
*Director of the United States Patent and Trademark Office*